United States Patent
Raynel et al.

(10) Patent No.: US 12,179,129 B2
(45) Date of Patent: Dec. 31, 2024

(54) SYNERGETIC SOLVENT FOR CRUDE OIL EMULSION BREAKERS

(71) Applicant: Saudi Arabian Oil Company, Dhahran (SA)

(72) Inventors: Guillaume Robert Jean-Francois Raynel, Dhahran (SA); Mustafa Al-Talaq, Al Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 339 days.

(21) Appl. No.: 17/550,804

(22) Filed: Dec. 14, 2021

(65) Prior Publication Data

US 2023/0294019 A1    Sep. 21, 2023

(51) Int. Cl.
| | |
|---|---|
| *C10L 10/00* | (2006.01) |
| *B01D 17/04* | (2006.01) |
| *C08G 61/02* | (2006.01) |
| *C10G 33/04* | (2006.01) |

(52) U.S. Cl.
CPC ........... *B01D 17/047* (2013.01); *C08G 61/02* (2013.01); *C10G 33/04* (2013.01); *C10L 10/00* (2013.01); *C08G 2261/1412* (2013.01); *C08G 2261/1424* (2013.01); *C08G 2261/90* (2013.01); *C10L 2300/00* (2013.01)

(58) Field of Classification Search
CPC .................. B01D 17/047; C08G 61/02; C08G 2261/1412; C08G 2261/1424; C08G 2261/90; C10G 33/04; C10G 31/08; C10L 10/00; C10L 2300/00
See application file for complete search history.

(56) References Cited

U.S. PATENT DOCUMENTS

| | | |
|---|---|---|
| 2,499,370 A | 3/1940 | De Groote et al. |
| 2,221,518 A | 11/1940 | Jennings |
| 2,383,674 A | 8/1945 | Osborne |
| 2,557,081 A | 6/1951 | De Groote et al. |
| 2,602,053 A | 7/1952 | De Groote et al. |
| 2,711,388 A | 6/1955 | Mottern et al. |
| 2,758,477 A | 8/1956 | Albert |
| 2,825,026 A | 2/1958 | Holaday et al. |
| 3,133,437 A | 5/1964 | Remke |
| 3,222,918 A | 12/1965 | Kuntz |
| 3,462,596 A | 8/1969 | Saunders |
| 3,528,775 A | 9/1970 | Siegfriedt |
| 3,539,917 A | 11/1970 | Chleck |
| 3,546,926 A | 12/1970 | Dunavent, Jr. et al. |

(Continued)

FOREIGN PATENT DOCUMENTS

| | | |
|---|---|---|
| AU | 2004204512 | 7/2004 |
| AU | 2016214075 | 2/2020 |

(Continued)

OTHER PUBLICATIONS

U.S. Appl. No. 16/704,973, filed Dec. 15, 2019, Villete et al.

(Continued)

*Primary Examiner* — Taiwo Oladapo
(74) *Attorney, Agent, or Firm* — Fish & Richardson P.C.

(57) ABSTRACT

This disclosure relates to demulsifier compositions containing one or more demulsifying polymers and an alkyl carboxylic acid solvent, and methods of using the compositions for separating water-in-oil emulsions.

26 Claims, 2 Drawing Sheets

(56) References Cited

U.S. PATENT DOCUMENTS

| | | |
|---|---|---|
| 3,553,576 A | 1/1971 | Petitjean |
| 3,684,735 A | 8/1972 | De Groote et al. |
| 3,727,049 A | 4/1973 | Saunders |
| 3,752,877 A | 8/1973 | Beavon |
| 3,778,706 A | 12/1973 | Thompson |
| 3,806,435 A | 4/1974 | Ohta |
| 3,982,564 A | 9/1976 | Clabburn et al. |
| 4,001,386 A | 1/1977 | Klein et al. |
| 4,034,219 A | 7/1977 | Louden et al. |
| 4,084,306 A | 4/1978 | Barker |
| 4,157,247 A | 6/1979 | Collins, III et al. |
| 4,178,358 A | 12/1979 | Smith et al. |
| 4,180,457 A | 12/1979 | Popp et al. |
| 4,253,928 A | 3/1981 | Blutas et al. |
| 4,301,400 A | 11/1981 | Paap |
| 4,428,839 A | 1/1984 | Davies et al. |
| 4,466,946 A | 8/1984 | Goddin, Jr. et al. |
| 4,481,130 A | 11/1984 | Robertson |
| 4,526,662 A | 7/1985 | Bylery et al. |
| 4,537,701 A | 8/1985 | Oppenlaender et al. |
| 4,543,191 A | 9/1985 | Stewart et al. |
| 4,581,134 A | 4/1986 | Richter, Jr. et al. |
| 4,589,896 A | 5/1986 | Chen et al. |
| 4,592,849 A | 6/1986 | McMillen |
| 4,627,458 A | 12/1986 | Prasad |
| 4,701,187 A | 10/1987 | Choe |
| 4,717,407 A | 1/1988 | Choe et al. |
| 4,737,265 A | 4/1988 | Merchant, Jr. et al. |
| 4,742,304 A | 5/1988 | Schnall et al. |
| 4,797,550 A | 1/1989 | Nelson et al. |
| 4,818,410 A | 4/1989 | Bellos et al. |
| 4,959,160 A | 9/1990 | Lake |
| 4,961,858 A | 10/1990 | Spei et al. |
| 4,995,952 A | 2/1991 | Dandapani et al. |
| 5,023,069 A | 6/1991 | Serrand |
| 5,035,065 A | 7/1991 | Parkinson |
| 5,067,345 A | 11/1991 | Mougne |
| 5,089,781 A | 2/1992 | Arichika et al. |
| 5,187,101 A | 2/1993 | Kato |
| 5,246,597 A | 9/1993 | Jenson et al. |
| 5,256,305 A | 10/1993 | Hart |
| 5,259,239 A | 11/1993 | Gaisford |
| 5,294,553 A | 3/1994 | Kawahara |
| 5,353,237 A | 10/1994 | Bass et al. |
| 5,381,002 A | 1/1995 | Morrow et al. |
| 5,401,300 A | 3/1995 | Lokhandwala et al. |
| 5,407,466 A | 4/1995 | Lokhandwala et al. |
| 5,407,467 A | 4/1995 | Lokhandwala et al. |
| 5,431,877 A | 7/1995 | Brucken et al. |
| 5,454,258 A | 10/1995 | Capuano |
| 5,531,865 A | 7/1996 | Cole |
| 5,632,803 A | 5/1997 | Stoner |
| 5,693,257 A | 12/1997 | Hart |
| 5,837,032 A | 11/1998 | Moll et al. |
| 5,885,424 A | 3/1999 | Davis et al. |
| 6,039,880 A | 3/2000 | Morataya |
| 6,096,239 A | 8/2000 | Fung et al. |
| 6,153,656 A | 11/2000 | Bourg |
| 6,168,702 B1 | 1/2001 | Varadaraj et al. |
| 6,179,900 B1 | 1/2001 | Behling et al. |
| 6,241,871 B1 | 6/2001 | Donini et al. |
| 6,361,582 B1 | 3/2002 | Pinnau et al. |
| 6,364,940 B1 | 4/2002 | Prueter et al. |
| 6,402,813 B2 | 6/2002 | Monereau et al. |
| 6,451,252 B1 | 9/2002 | Ruan et al. |
| 6,555,009 B2 | 4/2003 | Varadaraj |
| 6,614,242 B2 | 9/2003 | Matter et al. |
| 6,656,249 B1 | 12/2003 | Buisnnan |
| 6,896,717 B2 | 5/2005 | Pinnau et al. |
| 7,036,531 B2 | 5/2006 | Manini et al. |
| 7,306,735 B2 | 12/2007 | Baggott et al. |
| 7,469,188 B2 | 12/2008 | Wee |
| 7,901,646 B2 | 3/2011 | Ayala et al. |
| 7,976,710 B2 | 7/2011 | Minhas et al. |
| 8,043,418 B2 | 10/2011 | Ruud et al. |
| 8,101,086 B2 | 1/2012 | Varadaraj et al. |
| 8,115,481 B2 | 2/2012 | Chen |
| 8,197,673 B2 | 6/2012 | Khan |
| 8,323,392 B2 | 12/2012 | Jones |
| 8,361,200 B2 | 1/2013 | Sayaryi et al. |
| 8,397,765 B2 | 3/2013 | Jackson et al. |
| 8,524,184 B2 | 9/2013 | Iyengar et al. |
| 8,551,199 B2 | 10/2013 | Thacker et al. |
| 8,685,236 B2 | 4/2014 | Miller |
| 8,716,689 B2 | 5/2014 | Chen et al. |
| 8,722,003 B1 | 5/2014 | Avagliano et al. |
| 8,790,509 B2 | 7/2014 | Vu |
| 8,805,587 B1 | 8/2014 | Elshafei et al. |
| 8,828,121 B1 | 9/2014 | He et al. |
| 9,092,124 B2 | 7/2015 | Amminudin et al. |
| 9,096,805 B2 | 8/2015 | Williams |
| 9,149,761 B2 | 10/2015 | Northrop et al. |
| 9,157,035 B1 | 10/2015 | Ball, IV et al. |
| 9,181,499 B2 | 11/2015 | Mason et al. |
| 9,244,017 B2 | 1/2016 | Cadieux et al. |
| 9,295,957 B2 | 5/2016 | Choi et al. |
| 9,399,866 B2 | 7/2016 | Alawadhi |
| 9,435,571 B2 | 9/2016 | Ghoshal et al. |
| 9,448,221 B2 | 9/2016 | Duval et al. |
| 9,493,712 B2 | 11/2016 | Barroeta et al. |
| 9,555,345 B2 | 1/2017 | Al-shafei et al. |
| 9,708,196 B2 | 7/2017 | Brenize et al. |
| 9,731,974 B2 | 8/2017 | Weiss et al. |
| 9,861,910 B2 | 1/2018 | Hammad et al. |
| 9,863,571 B2 | 1/2018 | Critsinelis et al. |
| 9,927,169 B2 | 3/2018 | Baker et al. |
| 9,943,802 B1 | 4/2018 | Ballaguet et al. |
| 10,024,835 B2 | 7/2018 | Sreekumar |
| 10,106,410 B2 | 10/2018 | Ballaguet et al. |
| 10,106,411 B2 | 10/2018 | Ballaguet et al. |
| 10,188,988 B2 | 1/2019 | Debrock et al. |
| 10,197,545 B2 | 2/2019 | Sreekumar et al. |
| 10,260,007 B2 | 4/2019 | Barroeta et al. |
| 10,260,010 B2 | 4/2019 | Soliman |
| 10,365,049 B2 | 7/2019 | Tso et al. |
| 10,386,284 B2 | 8/2019 | Zhang |
| 10,472,576 B2 | 11/2019 | Salu et al. |
| 10,479,684 B2 | 11/2019 | Ballaguet et al. |
| 10,508,033 B2 | 12/2019 | Ballaguet et al. |
| 10,513,663 B2 | 12/2019 | Soliman et al. |
| 10,589,223 B1 | 3/2020 | Raynel et al. |
| 10,662,061 B1 | 5/2020 | Lithoxoos et al. |
| 10,765,995 B2 | 9/2020 | Hamad et al. |
| 10,889,766 B2 | 1/2021 | Barreau et al. |
| 11,008,521 B1 | 5/2021 | Raynel et al. |
| 11,112,190 B2 | 9/2021 | Villette et al. |
| 11,131,660 B2 | 9/2021 | Ahmed et al. |
| 11,148,962 B2 | 10/2021 | Alghunaimi et al. |
| 11,247,919 B2 | 2/2022 | Raynel |
| 2003/0082096 A1 | 5/2003 | Lynn |
| 2003/0099594 A1 | 5/2003 | Lyon |
| 2005/0158235 A1 | 7/2005 | Ramani et al. |
| 2005/0217479 A1 | 10/2005 | Hale et al. |
| 2006/0186340 A1 | 8/2006 | Lievois |
| 2006/0286675 A1 | 12/2006 | Coleman |
| 2007/0183953 A1 | 8/2007 | Kerley et al. |
| 2009/0166028 A1 | 7/2009 | Varadaraj et al. |
| 2009/0179636 A1 | 7/2009 | Chen |
| 2009/0306232 A1 | 12/2009 | Williams |
| 2009/0321323 A1 | 12/2009 | Sharma et al. |
| 2010/0260551 A1 | 10/2010 | Jespersen et al. |
| 2010/0264014 A1 | 10/2010 | Mignon et al. |
| 2011/0073206 A1 | 3/2011 | Na |
| 2011/0138854 A1 | 6/2011 | Huang et al. |
| 2011/0185896 A1 | 8/2011 | Sethna et al. |
| 2011/0194105 A1 | 8/2011 | LaFrancois et al. |
| 2011/0309463 A1 | 12/2011 | Kruglick |
| 2012/0012804 A1 | 1/2012 | Chen |
| 2012/0111051 A1 | 5/2012 | Kulkarni et al. |
| 2012/0168154 A1 | 7/2012 | Chinn et al. |
| 2012/0273367 A1 | 11/2012 | Themy et al. |
| 2012/0323059 A1 | 12/2012 | Liu et al. |
| 2013/0026082 A1 | 1/2013 | Al-Shafei et al. |
| 2013/0104772 A1 | 5/2013 | Schabron et al. |

(56) References Cited

U.S. PATENT DOCUMENTS

| | | |
|---|---|---|
| 2013/0110411 A1 | 5/2013 | Black et al. |
| 2013/0213892 A1 | 8/2013 | Henthorne et al. |
| 2013/0277551 A1 | 10/2013 | Bourrel et al. |
| 2014/0246382 A1 | 9/2014 | Matza et al. |
| 2014/0262953 A1 | 9/2014 | Ng et al. |
| 2014/0338395 A1 | 11/2014 | Oelfke et al. |
| 2015/0106027 A1 | 4/2015 | Koseoglu et al. |
| 2015/0136234 A1 | 5/2015 | Zulfiquar |
| 2015/0152340 A1 | 6/2015 | Cherney et al. |
| 2015/0175904 A1 | 6/2015 | Yeganeh et al. |
| 2015/0225655 A1 | 8/2015 | Adams et al. |
| 2015/0231555 A1 | 8/2015 | He et al. |
| 2015/0240717 A1 | 8/2015 | Starcher et al. |
| 2015/0267127 A1 | 9/2015 | Yeganeh et al. |
| 2015/0290575 A1 | 10/2015 | Rothermel et al. |
| 2015/0298972 A1 | 10/2015 | Ballaguet et al. |
| 2016/0018049 A1 | 1/2016 | Yodogawa et al. |
| 2016/0121258 A1 | 5/2016 | First |
| 2016/0195344 A1 | 7/2016 | Tomita et al. |
| 2016/0228813 A1 | 8/2016 | Schwartz |
| 2017/0045290 A1 | 2/2017 | Ploeger et al. |
| 2017/0190574 A1 | 7/2017 | Ercan et al. |
| 2017/0254793 A1 | 9/2017 | Al-Amri |
| 2017/0312682 A1 | 11/2017 | Keller |
| 2017/0319984 A1 | 11/2017 | Oshinowo |
| 2017/0320736 A1 | 11/2017 | Voss et al. |
| 2017/0369791 A1 | 12/2017 | Khan et al. |
| 2018/0031524 A1 | 2/2018 | Hassell |
| 2018/0066194 A1 | 3/2018 | Soliman et al. |
| 2018/0179097 A1 | 6/2018 | Navarro et al. |
| 2018/0187095 A1 | 7/2018 | Soliman |
| 2018/0195010 A1 | 7/2018 | Salu et al. |
| 2018/0202726 A1 | 7/2018 | Tso et al. |
| 2018/0216016 A1 | 8/2018 | Bakas et al. |
| 2018/0291282 A1 | 10/2018 | Soliman |
| 2018/0371876 A1 | 12/2018 | Lopez et al. |
| 2019/0010052 A1 | 1/2019 | Ballaguet et al. |
| 2019/0016598 A1 | 1/2019 | Ballaguet et al. |
| 2019/0027615 A1 | 1/2019 | Zheng et al. |
| 2019/0062645 A1 | 2/2019 | Al Seraihi et al. |
| 2019/0136113 A1 | 5/2019 | Holtsclaw et al. |
| 2019/0194526 A1 | 6/2019 | Holtsclaw et al. |
| 2019/0211274 A1 | 7/2019 | Soliman et al. |
| 2019/0227020 A1 | 7/2019 | Tamida et al. |
| 2019/0240613 A1 | 8/2019 | Raynel et al. |
| 2019/0247770 A1 | 8/2019 | Oshinowo |
| 2019/0353356 A1 | 11/2019 | Fischer |
| 2020/0023310 A1 | 1/2020 | Luo et al. |
| 2020/0028053 A1 | 1/2020 | Strano |
| 2020/0040263 A1 | 2/2020 | Khuzzan et al. |
| 2021/0031139 A1 | 2/2021 | Hamad et al. |
| 2021/0080446 A1 | 3/2021 | Ahmed |
| 2021/0172689 A1 | 6/2021 | Villette |
| 2021/0189260 A1 | 6/2021 | Robert |
| 2021/0363032 A1 | 11/2021 | Robert et al. |
| 2021/0395619 A1 | 12/2021 | Raynel et al. |
| 2021/0396731 A1 | 12/2021 | Duval et al. |

FOREIGN PATENT DOCUMENTS

| | | | |
|---|---|---|---|
| CA | 2968601 | | 6/2016 |
| CN | 1386563 | | 12/2002 |
| CN | 1844066 | | 10/2006 |
| CN | 101522595 | | 9/2009 |
| CN | 102085454 | | 6/2011 |
| CN | 103980950 | | 8/2014 |
| CN | 104001408 | | 8/2014 |
| CN | 104520411 | | 4/2015 |
| CN | 205534838 | | 8/2016 |
| CN | 105974098 | | 9/2016 |
| CN | 109696372 | | 4/2019 |
| CN | 109882683 | | 6/2019 |
| CN | 110127623 | | 8/2019 |
| CN | 110280941 | | 9/2019 |
| CN | 110711995 | | 1/2020 |
| CN | 111167317 | | 5/2020 |
| CN | 111365568 | | 7/2020 |
| DE | 102004010650 | | 9/2005 |
| EP | 0230683 | | 8/1987 |
| EP | 0195447 | | 10/1989 |
| EP | 0684066 | | 11/1995 |
| EP | 2932239 | | 10/2015 |
| EP | 3254010 | | 12/2017 |
| EP | 2932248 | | 2/2020 |
| FR | 2675709 | | 10/1992 |
| FR | 2676006 | | 11/1992 |
| GB | 1374010 | | 11/1974 |
| GB | 2336668 | | 10/1999 |
| GB | 0908527 | | 5/2009 |
| JP | S56162001 | | 12/1981 |
| JP | S 6140555 | | 2/1986 |
| JP | 2001133450 | | 5/2001 |
| JP | 3764701 | | 4/2006 |
| KR | 20110134562 | | 12/2011 |
| KR | 101947311 | | 5/2019 |
| KR | 102128754 | | 7/2020 |
| SU | 1183890 | | 10/1985 |
| TW | I579034 | | 4/2017 |
| WO | WO 1993025636 | | 12/1993 |
| WO | WO 2004022796 | | 3/2004 |
| WO | WO 2005037883 | | 4/2005 |
| WO | WO 2009111008 | | 9/2009 |
| WO | WO 2010133315 | | 11/2010 |
| WO | WO 2011069192 | | 6/2011 |
| WO | WO 2015074739 | | 5/2015 |
| WO | WO 2016069722 | | 5/2016 |
| WO | WO 2016102568 | | 6/2016 |
| WO | WO 2017008748 | | 1/2017 |
| WO | WO 2017020919 | | 2/2017 |
| WO | WO 2017220655 | | 12/2017 |
| WO | WO 2018022756 | | 2/2018 |
| WO | WO 2018097718 | | 5/2018 |
| WO | WO 2018129228 | | 7/2018 |
| WO | WO 2018165512 | | 9/2018 |
| WO | WO 2018169903 | | 9/2018 |
| WO | WO 2018236644 | | 12/2018 |
| WO | WO 2019015828 | | 1/2019 |
| WO | WO-2019015828 A1 * | 1/2019 | ........... B01D 17/047 |
| WO | WO 2013068320 | | 5/2019 |
| WO | WO 2019171409 | | 9/2019 |
| WO | WO 2020225060 | | 11/2020 |
| WO | WO 2020225061 | | 11/2020 |
| WO | WO 2020225062 | | 11/2020 |
| WO | WO 2020225063 | | 11/2020 |
| WO | WO 2021113572 | | 6/2021 |

OTHER PUBLICATIONS

U.S. Appl. No. 16/741,853, filed Jan. 24, 2020, Raynel et al.
U.S. Appl. No. 17/009,573, filed Sep. 1, 2020, Villete et al.
U.S. Appl. No. 17/009,579, filed Sep. 1, 2020, Villete et al.
U.S. Appl. No. 17/103,685, filed Nov. 24, 2020, Villete et al.
Abiev et al., "Non-thermal plasma for process and energy intensification in dry reforming of methane," Catalysts, Nov. 2020, 10:1358.
Abrams et al., "Use of seawater in flue gas desulfurization," JAPCA, 1988, 38(7):969-974, 7 pages.
AlQahtani et al., "One-Step Low-Temperature Reduction of Sulfur Dioxide to Elemental Sulfur by Plasma-Enhanced Catalysis," ACS Catal., 2020, 10: 5272-5277, 6 pages.
AlQahtani et al., "Plasma-assisted catalytic reduction of SO2 to elemental sulfur: Influence of nonthermal plasma and temperature on iron sulfide catalyst," Journal of Catalysis, Nov. 2020, 391: 260-272, 13 pages.
Amo et al., "Low-Quality Natural Gas Sulfur Removal/Recovery," Membrane Technology and Research, DOE Report DE-AC21-92MC28133—01, Jan. 29, 1998, 107 pages.
An et al., "Synthesis and SO2 Absorption/Desorption Properties of Poly(1,1,3,3-tetramethylguanidine acrylate)," Macromolecules, Apr. 2007, 40(9):3388-3393.
Andreasen et al., "Use of Seawater Scrubbing for SO2 Removal from Marine Engine Exhaust Gas", Energy & Fuels, 2007, 21:3274-3279, 6 pages.

(56) References Cited

OTHER PUBLICATIONS

Aschoundong et al., "Silane Modification of Cellulose Acetate Dense Films as Materials for Acid Gas Removal Macromolecules," American Chemical Society (ASC) Publications, Macromolecules 46:14 (5584-5594), Jul. 9, 2013, 11 pages.
ASTM "D 3921-85: Standard test method for oil and grease and petroleum hydrocarbons in water," 1985 (reapproved 1990), ASTM International, 5 pages.
ASTM "D 4281-95: Standard test method for oil and grease (fluorocarbon extractable substances) by gravimetric determination," an American Standard, 1995, reapproved 2005, 6 pages.
ASTM "D 7066-04, Standard test method for dimer/trimer of chlorotrifluoroethylene (S-316) recoverable oil and grease and nonpolar by Infared determination," 2007, 9 pages.
Belov et al., "Gas transport and free vol. in hexafluoropropylene polymers," Journal of Membrane Science, vol. 383, Nov. 2011, 8 pages.
Ben-Shebil, "Effect of heat of adsorption on the adsorptive drying of solvents at equilibrium in a packed bed of zeolite," Chemical Engineering Journal, 74:3 (197-204), Jul. 1999, 8 pages.
Bernardo et al., "Gas transport properties of Pebax/room temperature ionic liquid gel membranes" Separation and Purification Technology 97: 73-82, Sep. 2012, 13 pages.
Bhide et al., "Hybrid processes for the removal of acid gases from natural gas," Journal of Membrane Science 140:1 (27-49), Mar. 4, 1998, 2 pages, Abstract Only.
Bogaerts et al., "CO2 conversion by plasma technology: Insights from modeling the plasma chemistry and plasma reactor design," Plasma Sources Science and Technology, May 2017, 26(6):063001.
Bogaerts et al., "Plasma-based conversion of CO2: Current status and future challenges," Faraday Discussions, 2015, 183:217-232.
Bothamley, "Quantifying Oil/water Separation Performance in Three-Phase Separators—Part 1," Mar. 22, 2017, Mark Bothamley Consulting LLC., 14 pages.
Chatterjee et al., "Poly(ether urethane) and poly(ether urethane urea) membranes with high $H_2S/CH_4$ selectivity," Journal of Membrane Science 135:99 (99-106), Nov. 1997, 8 pages.
Chen et al., "High CO2 permeability of ceramic-carbonate dual-phase hollow fiber membrane at medium-high temperature", Journal of Membrane Science, Mar. 2020, 597:117770.
Christopoulos, "Reliable computations of knee point for a curve and introduction of a unit invariant estimation," National and Kapodistrian University of Athens, Dec. 2014, 9 pages.
Cirne et al., "Methods for Determination of Oil and Grease Contents in Wastewater from the Petroleum Industry," Chemistry and Chemical Technology 10:4, 2016, 8 pages.
Cui et al., "Ultrahigh and Selective SO2 Uptake in Inorganic Anion-Pillared Hybrid Porous Materials," Advanced Materials, May 2017, 29(28):1606929.
Curcio et al., "Hybrid nanofiltration—membrane crystallization system for the treatment of sulfate wastes," Journal of Membrane Science 360.1-2 (2010): 493-498.
Dang et al., "Research on decomposition of hydrogen sulfide using non-thermal plasma with metal oxide catalysis," Energy Procedia, 2012, 16:856-862.
De Bie et al., "Fluid modeling of the conversion of methane into higher hydrocarbons in an atmospheric pressure dielectric barrier discharge," Plasma Processes and Polymers, 2011, 8(11):1033-1058.
Delfino et al., "A simple and fast method to determine water content in biodiesel by electrochemical impedance spectroscopy," Talanta 2018, 179, 753-759, 26 pages.
digitalrefining.com [online], "Labsorb: A regenerable wet scrubbing process for controlling SO2 emissions," Jan. 2001, retrieved on Jan. 11, 2022, retrieved from URL<https://www.digitalrefining.com/article/1000818/labsorb-a-regenerable-wet-scrubbing-process-for-controlling-so2-emissions#. Yd3Ha9HMKUk>, 2 pages.
Diomede et al., "Insight into CO dissociation in plasmas from numerical solution of a vibrational diffusion equation," J. Phys. Chem. C, Aug. 2017, 121(36)19568-19576.
Elinoff et al., "Thermal diode can control direction of heat flow," Electronic Products Magazine, Apr. 2017, 2 pages.
EPA, "Method 1664, Revision A: N-Hexane Extractable Material (HEM; Oil and Grease) and Silica Gel Treated N-Hexane Extractable Material (SGT-HEM; Non-polar material) by Extraction and Gravimetry," United States Environmental Protection Agency, Office of Water, Washington D.C., EPA-821-R-98-002, PB99-121949, Feb. 1999, 28 pages.
EPA, "Method 1664, Revision B: n-Hexane Extractable Material (HEM; Oil and Grease) and Silica Gel Treated n-Hexane Extractable Material (SGT-HEM; Non-polar Material) by Extraction and Gravimetry," United States Environmental Protection, Office of Water Agency, Feb. 2010, 35 pages.
EPA, "Oil and Grease (Gravimetric, Separatory Funnel Extraction)," Method # 413.1, Storet No. 00556, Issued in 1974, Editorial revision 1978, Standard test method for oil and grease using gravimetric determination, approved for NPDES, 3 pages.
EPA, "Oil and Grease (Spectrophotometric, Infrared)," Method # 413.2, Storet No. 00560, Issued in 1974, Editorial revision 1978, Standard test method for Oil and grease analysis using Freon extraction and IR absorbance without the Freon extract being treated by silica gel, 3 pages.
EPA, "Petroleum Hydrocarbons (Spectrophotometric, Infrared)," Method # 418.1, Storet No. 45501, Issued in 1978, Petroleum Hydrocarbons, 3 pages.
Foruny, "Measuring Salinity in crude oils: Evaluation of methods and an improved performance," 2008, Fuel, 1241-1248.
Froschauer et al., "No. Matter of Course: Ionic Liquids as SO2-Selective Gas Absorbers," Lenzinger Berichte, Jan. 2013, 91:30-43.
Gabrus et al., "Experimental studies on 3A and 4A zeolite molecular sieves regeneration in TSA process: Aliphatic alcohols dewatering-water desorption," Chemical Engineering Journal 259: 232-242, Jan. 2015, 11 pages.
Glasoe et al, "Solubility of water and deuterium oxide in carbon tetrachloride, toluene, and cyclohexane at various temperatures," Journal of Chemical & Engineering Data, 17(1): 66-68, 1972, 3 pages.
Hasenberg, "Sulfur Dioxide," in G. Kreysa and M. Schutze, Corrosion Handbook, vol. 10: Sulfur Dioxide, sodium sulfate, p. 5-37. Weinheim: Wiley, May 2008.
Hatcher et al., "Sour water stripping Part 2: phenolic water," Digital Refining, Aug. 2014.
Heijkers et al., "Plasma-based CH4 conversion into higher hydrocarbons and H2: Modeling to reveal the reaction mechanisms of different plasma sources," Journal of Physical Chemistry, May 2020, 124:7016-7030.
Hibbard and Schalla, "NACA Research Memorandum: Solubility of Water in Hydrocarbons," National Advisory Committee for Aeronautics, Washington, Jul. 10, 1952, 27 pages.
Huang et al., "Facilitated separation of CO2 and SO2 through supported liquid membranes using carboxylate-based ionic liquids," Journal of Membrane Science, Dec. 2014, 471:227-236.
International Standard, "ISO 5667-3: Water quality—sampling—part 3: guidance on the preservation and handling of water samples," 3rd edn, Dec. 15, 2003, 38 pages.
International Standard, "ISO 9377-2: Water quality—determination of hydrocarbon oil index—Part 2: Method using solvent extraction and gas chromatography," First edition, Oct. 15, 2000, 24 pages.
IP, "Determination of the oil content of effluent water—extraction and infra-red spectrometric method," IP 429/98, Oil in Water, 2012, 5 pages.
Jansen et al., "On the unusual solvent and the effect on the gas transport in perfluorinated Hyflon AD Membranes," Journal of Membrane Science 287:1 (132-137), Jan. 2007, 6 pages.
Johnson et al, "The Molecular Complexity of Water in Organic Solvents Part II," J. Chem. Soc. A, Inorganic Phys. Theoretical 77-78, 1966, 2 pages.
Kado et al., "Diagnosis of atmospheric pressure low temperature plasma and application to high efficient methane conversion", Catal. Today, Feb. 2004, 89:47-55.
Kanna et al., "Estimating the Amount of Moisture Content in Crude Oil Samples," International Refereed Journal of Engineering and Science (IRJES), Feb. 2017, 6(2): 59-62, 4 pages.

(56) References Cited

OTHER PUBLICATIONS

Khalifeh et al., "Decomposition of methane to hydrogen using nanosecond pulsed plasma reactor with different active vols. voltages and frequencies", Appl. Energy, May 2016, 169:585-596.

Kikkinides et al., "Gas Separation and Purification by Polymeric Adsorbents: Flue Gas Desulfurization and S02 Recovery with Styrenic Polymer," Ind. Eng. Chem. Res., Oct. 1993, 32(10):2365-2372.

Kim et al., "Effect of Demulsifier Partitioning on the Destabilization of Water-in-Oil Emulsions," Ind. Eng. Chem. Res., 1996, 35: 1141-1149, 9 pages.

Kim et al., "Separation performance of PEBAX/PEI hollow fiber composite membrane for SO2/CO2/N2 mixed gas," Chemical Engineering Journal, Nov. 2013, 233:242-250.

Kirchnerová et al, "The Solubility of Water in Low-Dielectric Solvents," Can. J. Chem 54(24): 3909-3916, Aug. 26, 1976, 8 pages.

Klaehn et al., "Humidified Gas stream Separation at High Temperatures Using Matrimid 5218," Separation Science and Technology, Nov. 2012, 47(14-15):2186-2191.

Knauss et al, "The solubility of p-xylene in water as a function of temperature and pressure and calculated thermodynamic quantities," Geochimica et Cosmochimica Acta vol. 59(12): 2443-2448, Jun. 1995, Mar. 1995, 6 pages.

Ko et al., "Analysis of purge gas temperature in cyclic TSA process," Pergmon, Chemical Engineering Science 57(1): 179-195, Jan. 2002, 17 pages.

Kraftschik et al., "Dense film polyimide membranes for aggressive sour gas feed separations," Journal of Membrane Science 428: 608-619, Feb. 1, 2013, 12 pages.

Kriebel, "Absorption, 2. Design of Systems and Equipment," Ullmann's Encyclopedia of Industrial Chemistry, 2012, 18 pages.

Lallemand et al., "Extending the treatment of highly sour gases: cryogenic distillation," Digital Refining: Processing, Operations & Maintenance, Jan. 2014, 8 pages.

Lallemand et al., "Highly sour gas processing: Bulk removal with SPREX Process," IPTC-10581-MS, International Petroleum Technology Conference, Nov. 2005, 18 pages.

Lallemand et al., "Solutions for the treatment of highly sour gases," Digital Refinding: Processing, Operations & Maintenance, Gas, Apr. 2012, 14 pages.

Lancia, et al., "Uncatalyzed heterogenous oxidation of calcium bisulfite," Chemical Engineering Science, Aug. 1996, 51(16), 3889-3896.

Lee et al., "Diamine-Anchored Polystyrene Resins for Reversible SO2 Adsorption," ACS Sustainable Chem. Eng., Feb. 2016, 4(4):2012-2019.

Lockhart, "Sour oil and gas management: 3.3," New Upstream Technologies, vol. III/New Developments: Energy, Transport, Sustainability Encyclopedia of Hydrocarbons, 2007, 34 pages.

Lokhandwala et al., "Membrane separation of nitrogen from natural gas: A case study from membrane synthesis to commercial deployment," Journal of Membrane Science 346: 270-279, Jan. 2010, 10 pages.

Lu et al., "Conversion of natural gas to C2 hydrocarbons via cold plasma technology," Journal of Natural Gas Chemistry, Jul. 2010, 19(4):375-379.

Maitre et al., "Plasma-enhanced catalysis for the upgrading of methane: A review of modelling and simulation methods," Reaction Chemistry & Engineering, Mar. 2020, 5:814-837.

Mandal et. al., "M.A.L.D.I.-T.O.F. mass spectrometry characterization of 4-alkyl substituted phenol-formaldehyde novalac type resins," Polymer, 1997, 38(26):6267-6271, 5 pages.

Martínez-Salazar et al., "Hydrogen production by methane reforming with H2S using Mo. Cr/ZrO2—SBA15 and Mo, Cr/ZrO2—La2O3 catalyst," Int. J. Hydrogen Energy, Dec. 2015, 48:17272-17283.

masterbond.com [online], "Epoxies with Low Coefficient of Thermal Expansion," available on or before May 12, 2015, via Internet Archive: Wayback Machine URL: <https://web.archive.org/web/20150512012852/https://www.masterbond.com/properties/epoxies-low-coefficient-thermal-expansion>, retrieved on Sep. 15, 2020, URL: <https://www.masterbond.com/properties/epoxies-low-coefficient-thermal-expansion>, 2 pages.

Merkel and Toy, "Comparison of Hydrogen Sulfide Transport Properties in Fluorinated and Nonfluorinated Polymers," Macromolecules 39:22 (7591-7600), Sep. 2006, 10 pages.

mitchell.com [online], "Impedance," Impedance Products, URL: <http://www.michell.com/uk/technology/impedence.htm> retrieved Sep. 9, 2019, available on or before Jun. 2019, 2 pages.

Mogildeea et al., "The assessment of carbon dioxide dissociation using a single-mode microwave plasma generator," Molecules, Mar. 2020, 25:1558.

Neisi, "Effect of Mixing Efficiency in Dilution Water Consumption in a Crude Oil Desalting Plant," 2011, 3rd International Conference on Chemical, Biological and Environmental Engineering, 20:109-113.

Odberg et al, "Studies of water in organic solvents using NMR and partition techniques-II Di-isopropyl ether, dibutyl phthalate and chloroform," Journal of Inorganic and Nuclear Chemistry 34:8 (2605-2616), Aug. 1972, Mar. 18, 1971, 12 pages.

Oikawa et al., "Seawater Flue Gas Deslfurization: Its Technical Implications and Performance Results," Environmental Progress, Apr. 2003, 22(1):67-73, 7 pages.

Paidar et al., "Membrane electrolysis—History, current status and perspective," Electrochimica Acta., 2016, 209: 737-756.

Palma et al., "A review about the recent advances in selected nonthermal plasma assisted solid-gas phase chemical processes," Nanomaterials, 2020, 10:1596.

PCT Application No. PCT/IB2019/061417, Lithoxoos et al., Regeneration Schemes for a Two Stage Adsorption Process for Claus Tail Gas Treatment, filed Dec. 28, 2019, 75 pages.

Ramakers et al., "Gliding arc plasmatron: Providing an alternative method for carbon dioxide conversion," ChemSusCHem, 2017, 10(12):2642-2652.

Ramasubramanian, "CO2 (H2S)-selective membranes for fuel cell hydrogen purification and flue gas carbon capture: an experimental and process modeling study", Dissertation for the degree of Doctor of Philosophy, Ohio state University, 2013, 270 pages.

Raynel et al., "A new method to select demulsifiers and optimize dosage at wet crude oil separation facilities," Oil & Gas Science and Technology—Rev. IFP Energies Nouvelles, 2021, 76(19), 11 pages.

Reddy et al., "Kinetics of hydrogen sulfide decomposition in a DBD plasma reactor operated at high temperature," Journal of Energy Chemistry, 2013, 22:382-386.

Ren et al., "Ionic liquids: Functionalization and absorption of SO2," Green Energy & Environment, Jul. 2018, 3(3):179-190.

Robeson, "The upper bound revisited," Journal of Membrane Science 320 (390-400), Jul. 15, 2008, 11 pages.

Roy et al., "Aspen-HYSYS Simulation of Natural Gas Processing Plant," Journal of Chemical Engineering, IEB, Dec. 2011, 26:1, 4 pages.

Rufford et al., "The removal of CO2 and N2 from natural gas: A review of conventional and emerging process technologies," Journal of Petroleum Science and Engineering 94-95: 123-154, Sep. 2012, 32 pages.

Schei et al., "Transient simulations of gas-oil-water separation plants," Modeling, Identification and Control, 1991, 12: 1 (27-46), 20 pages.

Sensorland.com [online], "Impedance Moisture Sensor Technology," How Sensors work—Moisture Sensors, retrieved from URL: <http://www.sensorland.com/HowPage029.html>, retrieved Sep. 9, 2019, 2 pages.

Shell Global Solutions International BV, "Cansolv Technologies Inc. SO2 Scrubbing System" fact sheet, 2010.

Simo et al., "Adsorption/Desorption of Water and Ethanol on 3A Zeolite in Near-Adiabatic Fixed Bed," Ind. Eng. Chem. Res. 48, 20, Sep. 2009, 14 pages.

Sivalls et al., "Oil and Gas Separation Design Manual," Section: 300, Technical Bulletin, Feb. 10, 2009, 142:7, 63 pages.

Sun et al., "Application of seawater to enhance SO2 removal from simulated flue gas through hollow fiber membrane contactor," Journal of Membrane Science, 2008, 312:6-14, 9 pages.

(56) References Cited

OTHER PUBLICATIONS

Tailor et al., "Supported Polytertiary Amines: Highly Efficient and Selective SO2 Adsorbents," Environ. Sci. Technol., Jan. 2014, 48(3):2025-2034.

Vaisala.com [online], "Vaisala HUMICAP Sensor for Measuring Moisture in Oil," Technology Description, retrieved from URL: <https://www.vaisala.com/sites/default/files/documents/HUMICAP-for-Moisture-in-oil-B211231EN-A.pdf> 2012, 2 pages.

Vasudevan, "Membranes and Diaphragms for Electrochemical Processes (Part—I)," Res. J. Chem. Sci., Feb. 2013, 3(2): 1-3.

Waterston et al., "Electrochemical oxidation of sulfide ion ata boron-doped diamond anode," Journal of applied electrochemistry 37.3 2007: 367-373.

Weiland et al., "Distribution of HCN in sour water systems—Digital Refining," Apr. 2014.

Whitehead, "Plasma-catalysis: The known knowns, the known unknowns and the unknown unknowns," Journal of Physics, May 2016, 49:243001.

Wikipedia.com [online] "Thermal Diode," last revised Feb. 2019, retrieved on Oct. 7, 2019, retrieved from URL <https://en.wikipedia.org/wiki/Thermal_diode>, 2 pages.

Wikipedia.com [online], "Dielectric barrier discharge," Retrieved Oct. 29, 2021 from URL <https://en.wikipedia.org/wiki/Dielectric barrier_discharge>, 7 pages.

Wu et al., "Effect of Demulsifier Properties on Destabilization of Water-in-Oil Emulsion," May 2003, Energy & Fuels, 2003, 17: 1554-1559, 6 pages.

Wu et al., "Preparation and SO2 Absorption /Desorption Properties of Crosslinked Poly(1,1,3,3-Tetramethylguanidine Acrylate) Porous Particles," Macromolecular Rapid Communications, Nov. 2006, 27(22):1949-1954.

Xia et al., "Efficient, Selective, and Reversible SO2 Capture with Highly Crosslinked Ionic Microgels via a Selective Swelling Mechanism," Advanced Functional Materials, Jan. 2018, 28(13):1704292.

Xu et al., "Non-thermal plasma catalysis for CO2 conversion and catalyst design for the process," J. Phys. D: Appl. Phys. Mar. 2021, 54:233001.

Xuan et al., "Plasma oxidation of H2S over non-stoichiometric LaxMnO3 perovskite catalysts in a dielectric barrier discharge reactor," Catalysts, Aug. 2018, 8:317.

Yang, "Chapter 2: Measurement of Oil in Produced Water," in Lee et al., Produced water, 57-88, Springer Science+Business Media, 2011, 32 pages.

Zhao et al., "Decomposition of hydrogen sulfide in non-thermal plasma aided by supported CdS and ZnS semiconductors", Green Chemistry, Apr. 2013, 15:1509-1513.

Zhao et al., "SO2 Absorption by Carboxylate Anion-Based Task-Specific Ionic Liquids: Effect of Solvents and Mechanism," Ind. Eng. Chem. Res., Dec. 2016, 55(50):12919-12928.

Zou et al., "CO2—Selective polymeric membranes containing amines in crosslinked poly (vinyl alcohol)," Journal of Membrane Science, Dec. 2006, 286:310-321.

Silva et al., "Breaking of water-in-crude oil emulsions. 5. Effect of acid alkaline additives on the performance of chemical demulsifiers," Energy and Fuels, Jun. 2014, American Chemical Society, 28:3587-3593, 7 pages.

PCT International Search Report and Written Opinion in International Appln. No. PCT/US2022/052646, dated Apr. 11, 2023, 14 pages.

\* cited by examiner

SYNERGETIC SOLVENT FOR CRUDE OIL EMULSION BREAKERS

TECHNICAL FIELD

This disclosure describes a wet crude oil emulsion demulsifier composition that contains a solvent and a demulsifying polymer. The solvent and demulsifying polymer display a synergetic effect, where the demulsifier composition is effective at demulsifying wet crude oil emulsions.

BACKGROUND

Crude oil is typically extracted with dispersed water in varying concentrations. The water-in-oil (W/O) emulsions are believed to initially be formed during the migration of oil and water through the porous reservoir rocks to the production wells and subsequent transport to production facilities for phase separation. Further emulsification of the water and oil can occur due to pressure drops across choke valves at production headers used to manage production flows, which creates significant agitation and turbulent energy.

The dispersed water droplets are stabilized by surface active compounds (surfactants) naturally present in the oil such as resins, asphaltenes, solid particles, and organic acids and bases. These surfactants migrate to the oil-water interface, forming a film around the water droplets and slowing the natural process of coalescence between droplets. The film significantly influences whether the emulsion separates easily (loose emulsion) or does not separate spontaneously (tight emulsion). Tight emulsions require great investment by oil companies in processes and chemical intervention to separate, or break, the emulsion to produce crude oil within export specifications of 0.2 v/v % basic sediment and water (BS&W) and 10 lbs. of total dissolved salts per thousand barrels of oil (PTB). Thus, the composition of crude oils can vary greatly from one producing field to another, resulting in different combinations of these parameters with unique effects. In some particularly tight oil emulsions, water cannot be separated solely by physical methods such as retention, heating, and electrocoalescence. In such cases, a combination of physical and chemical methods is required to achieve the desired water separation.

Crude oil production facilities require rapid and efficient separation of the water from the W/O emulsion to yield the wet crude oil that is then sent for further purification (desalting and dehydrating). Formulations or compositions containing compounds called demulsifiers, or demulsifying polymers, and a solvent, have been used to break such crude oil-water emulsions. To have a high-performing demulsifying formulation (for example, fast and able to dewater large volumes) allows for production of more on-spec dry crude oil as well as better control of the overall process (for example, loads on dehydrators).

Thus, there is a need for a demulsifier composition that is faster and more efficient in dewatering wet crude oil emulsions than known demulsifier compositions.

SUMMARY

Provided in the present disclosure is a demulsifier composition. In some embodiments, the demulsifier composition contains a demulsifying polymer; and a solvent. In some embodiments, the solvent is an alkyl carboxylic acid having an alkyl chain of 1 to 8 carbon atoms, a pKa of about 2 to about 7, and a $K_{ow}$ greater than about 0.1.

In some embodiments, the demulsifying polymer is an alkoxylated phenolic polymer or an alkoxylated polyalcohol. In some embodiments, the alkoxylated phenolic polymer is para-substituted with a saturated hydrocarbon chain. In some embodiments, the saturated hydrocarbon chain is selected from para-tertiary-alkyl, para-secondary-alkyl, para-iso-alkyl, para-cycloalkyl, and para-n-alkyl. In some embodiments, the saturated hydrocarbon chain is selected from para-tertiary-butylphenol, para-tertiary-amylphenol, para-tertiary-hexylphenol, and para-tertiary-heptylphenol.

In some embodiments, the alkoxylated phenolic polymer has the structure:

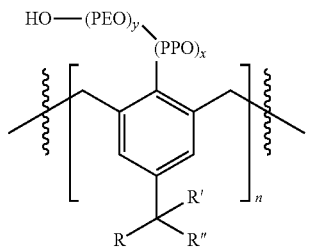

where: R is a saturated hydrocarbon chain having between 1 and 8 carbons; R' and R" are each independently selected from H and $C_1$-$C_2$ alkyl; wherein the total number of carbon atoms in R, R', and R" is between 3 and 8; PPO is polypropylene oxide having the formula:

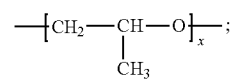

PEO is polyethylene oxide having the formula:

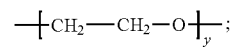

x is an integer between 0 and 10; y is an integer between 0 and 10; and n is an integer between 3 and 10.

In some embodiments, the demulsifying polymer has the structure:

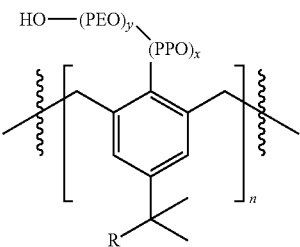

In some embodiments, the demulsifying polymer has the structure:

In some embodiments of the demulsifier composition, the solvent is an alkyl carboxylic acid having an alkyl chain of

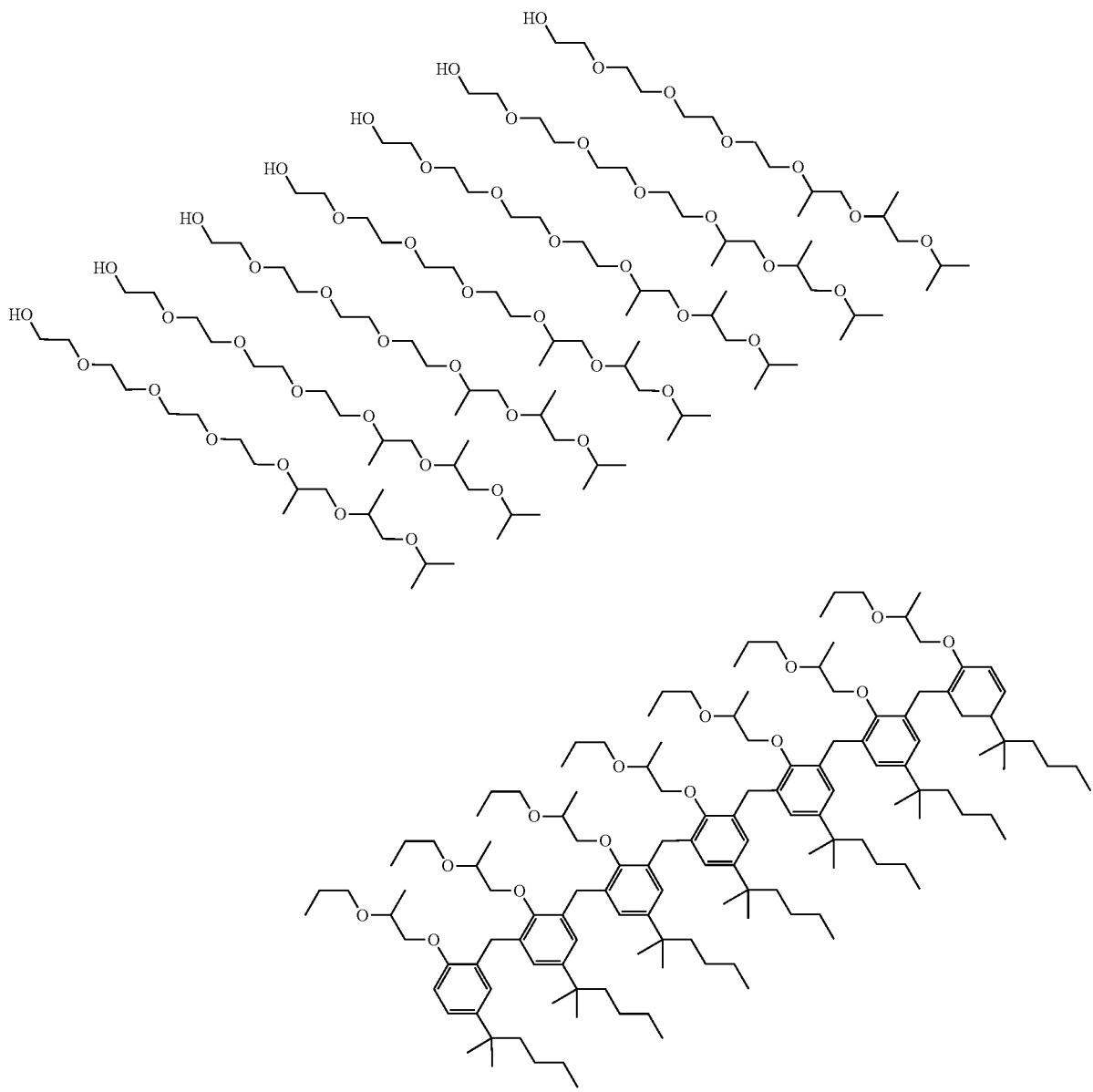

In some embodiments, the demulsifier composition contains about 25 wt % to about 50 wt % demulsifying polymer.

In some embodiments, the demulsifier composition contains about 20 wt % to about 60 wt % solvent.

In some embodiments of the demulsifier composition, the alkyl chain of the alkyl carboxylic acid is linear or branched.

In some embodiments of the demulsifier composition, the pKa is about 3 to about 6.

In some embodiments of the demulsifier composition, the alkyl carboxylic acid has a melting point of about 15° C. or lower. In some embodiments, the alkyl carboxylic acid has a melting point of about 10° C. or lower.

In some embodiments of the demulsifier composition, the alkyl carboxylic acid has a boiling point of about 80° C. or higher. In some embodiments, the alkyl carboxylic acid has a boiling point of about 90° C. or higher.

1 to 8 carbon atoms, where the solvent has a pKa between about 2 and about 7, a $K_{ow}$ greater than about 0.1, a melting point of about 15° C. or lower, and a boiling point of about 80° C. or higher.

In some embodiments of the demulsifier composition, the solvent is an alkyl carboxylic acid having an alkyl chain of 1 to 8 carbon atoms, where the solvent has a pKa between about 3 and about 6, a $K_{ow}$ greater than about 0.1, a melting point of about 10° C. or lower, and a boiling point of about 90° C. or higher.

In some embodiments, the demulsifier composition further comprising a clarifier. In some embodiments, the clarifier is selected from 1,2,4-trimethylbenzene, naphthalene, and combinations thereof. In some embodiments, the clarifier comprises about 0.1 wt % to about 10 wt % of the demulsifier composition.

Also provided in the present disclosure is a method of dewatering a water-in-oil emulsion. In some embodiments, the method includes adding the demulsifier composition of the present disclosure to a water-in-oil emulsion and separating the water from the emulsion. In some embodiments, the water-in-oil emulsion is a crude oil emulsion. In some embodiments, the crude oil emulsion is a refinery desalting emulsion. In some embodiments, the crude oil emulsion is a crude oil production emulsion.

Also provided in the present disclosure is a method of treating produced petroleum comprising an emulsion. In some embodiments, the method includes contacting the produced petroleum comprising the emulsion with the demulsifier composition of the present disclosure to reduce or eliminate the emulsion.

DETAILED DESCRIPTION

Figure 1:
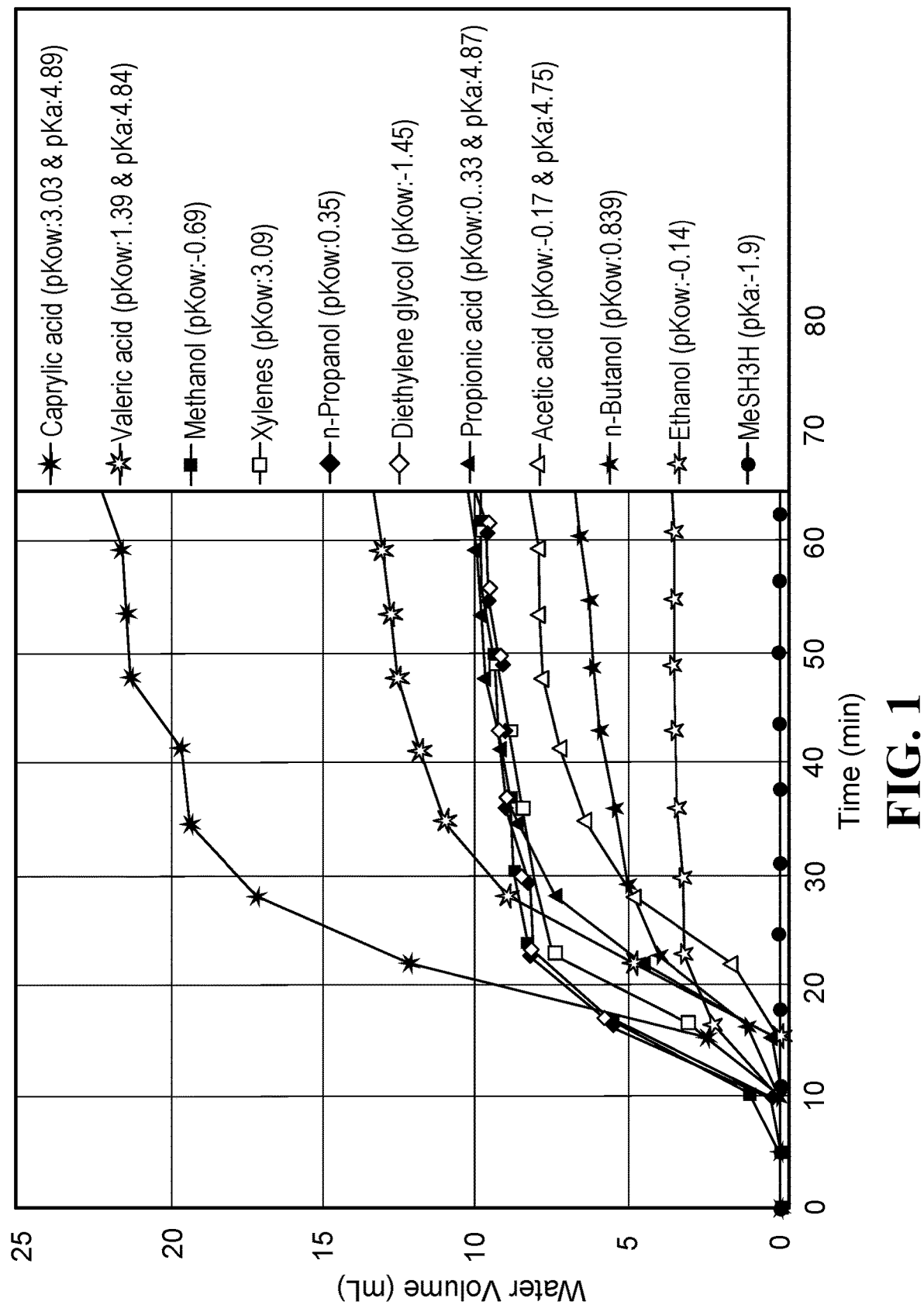
FIG. 1 is a graph showing the water separation performance at 30° C. of 50 ppm demulsifier compositions prepared from various solvents.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Due to a number of factors involved in the production process, oil and water mix, creating an emulsion. This is undesirable, because when crude oil is refined, the oil should be as dry as possible as water can damage the refinery, induce corrosion, and reduce the efficiency of the crude oil distillation process. Provided in the present disclosure are demulsifier compositions that can be used to break crude oil-water emulsions. The demulsifier compositions of the present disclosure contain a demulsifying polymer and a solvent, such as a solvent described in the present disclosure. In some embodiments, the solvent is an acid. In some embodiments, the solvent is a linear or branched alkyl carboxylic acid, where the alkyl chain has between 1 and 8 carbon atoms. In some embodiments, the solvent has a melting point below about 15° C., such as below about 10° C. In some embodiments, the solvent has a pKa of about 2 to about 7, such as about 3 to about 6. In some embodiments, the solvent has a $K_{ow}$ (coefficient of partition between n-octanol and water) that is greater than about 0.1. In some embodiments, the solvent has a boiling point higher than about 80° C., such as higher than about 90° C. In some embodiments, the solvent is non-toxic, is not highly flammable, or both. In some embodiments, the demulsifier composition contains a clarifier.

In some embodiments, the demulsifier compositions of the present disclosure exhibit improved water separation performance as compared to other demulsifier compositions that do not contain the solvent of the present disclosure. In some embodiments, the demulsifier compositions of the present disclosure separate water from oil more quickly than other demulsifier compositions that do not contain the solvent of the present disclosure. In some embodiments, the demulsifier compositions of the present disclosure are more efficient in dewatering wet crude oil emulsions than other demulsifier compositions that do not contain the solvent of the present disclosure. For example, the demulsifier compositions of the present disclosure allow for dewatering of larger volumes of water than other demulsifier compositions, such as those that contain a different solvent than a solvent described in the present disclosure. In some embodiments, a demulsifier composition containing a solvent of the present disclosure is more efficient at water separation as compared to compositions containing known demulsifying solvents, such as methanol, diethylene glycol, xylenes, and others.

The demulsifier compositions of the present disclosure are shown to be faster and more efficient at separating water from a wet crude oil emulsion than other demulsifier compositions that contain a solvent that differs from the solvent of the present disclosure. Thus, provided in the present disclosure are methods of separating water from a wet crude oil emulsion that involves addition of a demulsifier composition of the present disclosure to the emulsion. In some embodiments, the demulsifier compositions break stable emulsions. In some embodiments, the demulsifier compositions are used for water-in-crude oil emulsions during oilfield production at a gas-oil separation plant (GOSP). In some embodiments, the demulsifier compositions are used for desalting water-in-crude oil emulsion at a refinery.

Without wishing to be bound by any particular theory, it is believed that the combination of the specific properties of the solvent, as described in the present disclosure, that results in unexpected improvement in water separation.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

A "demulsifier," also known as an "emulsion breaker," is a chemical that is used to separate crude oil from water. Demulsifiers are chemicals designed to neutralize the stabilizing effect of emulsifying agents. Demulsifiers are surface-active compounds that, when added to the emulsion, migrate to the oil/water interface, rupture or weaken the rigid film, and enhance water droplet coalescence. The process by which oil and water emulsions are separated is known as "demulsification" and it can be done in a variety of ways, including addition of a chemical demulsifier to the emulsion. In some embodiments, the demulsifier is a polymer, referred to herein as a "demulsifying polymer."

"Dewatering," as used herein, is the process of removing or separating water from crude oil. In some embodiments, the water is removed or separated from an emulsion that is a water-in-oil emulsion.

As used in this disclosure, the term "subterranean formation" can refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region that is in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground that is in fluid contact with liquid or gaseous petroleum materials or water. In some embodiments, a subterranean formation is an oil well.

Demulsifier Compositions

Provided in this disclosure is a demulsifier composition containing a demulsifying polymer and an alkyl carboxylic acid solvent, where the alkyl carboxylic acid has an alkyl chain containing 1 to 8 carbon atoms and a carboxylic acid functional group, a pKa between about 2 and about 7, and a $K_{ow}$ greater than 0.1. The demulsifier compositions can be used to dewater wet crude oil emulsions. In some embodiments, compositions containing a demulsifying polymer and the solvent of the present disclosure are more efficient and faster at dewatering wet crude oil emulsions as compared to compositions that do not contain the solvent of the present disclosure, but contain other, known demulsifying solvents.

Demulsifying Polymers

The demulsifier compositions of the present disclosure contain a demulsifying polymer. Any demulsifying polymer known to those of skill in the art can be used in the demulsifier compositions of the present disclosure. Examples of suitable demulsifying polymers include, but are not limited to, alkoxylated polyalcohols, alkoxylated polyglycols, and alkoxylated phenols. In some embodiments, the demulsifying polymer is an alkoxylated phenolic polymer or an alkoxylated polyalcohol.

In some embodiments, the demulsifying polymer is an alkoxylated phenolic polymer. Alkoxylated phenolic polymers are constituted of a formaldehyde-phenolic backbone and a lipophilic polypropylene oxide (PPO) and hydrophilic polyethylene oxide (PEO) section, where the formaldehyde-phenolic backbone is composed of phenol that is para-substituted with a saturated hydrocarbon chain. In some embodiments, the saturated hydrocarbon chain contains between 4 and 9 carbons, such as between 4 and 8, 4 and 7, 4 and 6, 5 and 9, 5 and 8, 5 and 7, 6 and 9, 6 and 8, 7 and 9, or 4, 5, 6, 7, 8, or 9 carbons. In some embodiments, the alkoxylated phenolic polymer is para-substituted with a saturated hydrocarbon chain. In some embodiments, the saturated hydrocarbon chain is selected from para-tertiary-alkyl, para-secondary-alkyl, para-iso-alkyl, para-cycloalkyl, and para-n-alkyl. In some embodiments, the saturated hydrocarbon chain is selected from para-tertiary-butylphenol, para-tertiary-amylphenol, para-tertiary-hexylphenol, and para-tertiary-heptylphenol. In some embodiments the demulsifying polymer has a hydrocarbon chain composed of a propane segment substituted in the 2 position (the middle of the propane chain) by a saturated alkyl group. Examples of suitable demulsifying polymers include those disclosed in U.S. Pat. Nos. 2,499,370 and 2,557,081, each of which is incorporated by reference in its entirety.

In some embodiments, the demulsifying polymer is a compound having the structure:

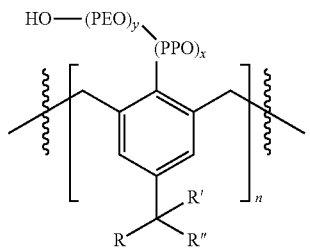

wherein:
R is a saturated carbon chain having between 1 and 8 carbons;
R' and R" are each independently selected from H and $C_1$-$C_2$ alkyl;
wherein the total number of carbon atoms in R, R', and R" is between 3 and 8;
PPO is polypropylene oxide having the formula:

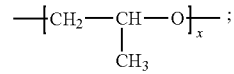

PEO is polyethylene oxide having the formula:

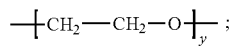

x is an integer between 0 and 10;

y is an integer between 0 and 10; and n is an integer between 3 and 10.

In some embodiments, R is a saturated hydrocarbon (alkyl) chain having between 1 and 8 carbon atoms, such as between 1 and 7, 1 and 6, 1 and 5, 1 and 4, 1 and 3, 2 and 8, 2 and 7, 2 and 6, 2 and 5, 2 and 4, 3 and 8, 3 and 7, 3 and 6, 3 and 5, 4 and 8, 4 and 7, 4 and 6, 5 and 8, 5 and 7, and 6 and 8. In some embodiments, R is an alkyl chain having 1, 2, 3, 4, 5, 6, 7, or 8 carbon atoms. In some embodiments, the alkyl chain is linear. In some embodiments, the alkyl chain is branched. In some embodiments, the alkyl chain has an iso-, neo-, or anteiso-branching pattern.

In some embodiments, R' and R" are each independently selected from H and $C_1$-$C_2$ alkyl. In some embodiments, R' and R" are each independently selected from H and methyl. In some embodiments, R' and R" are each H. In some embodiments, R' and R" are each $C_1$-$C_2$ alkyl. In some embodiments, R' and R" are each methyl. In some embodiments, R' and R" are each ethyl. In some embodiments, the demulsifying polymer has a 2-iso-alkyl-propyl group substituted on the phenol backbone in the para position.

In some embodiments, the total number of carbon atoms of R, R', and R" is between 3 and 8, such as between 3 and 7, 3 and 6, 3 and 5, 4 and 8, 4 and 7, 4 and 6, 5 and 9, 5 and 8, 5 and 7, 6 and 9, and 6 and 8, and 7 and 9, or 3, 4, 5, 6, 7, 8, or 9. In some embodiments, R is an alkyl chain having between 1 and 8 carbon atoms. In some embodiments, R is an alkyl chain having between 1 and 8 carbon atoms, R' is $C_1$-$C_2$ alkyl, and R" is $C_1$-$C_2$ alkyl. In some embodiments, R is an alkyl chain having between 1 and 8 carbon atoms, R' is methyl, and R" is methyl. In some embodiments, R is an alkyl chain having between 3 and 8 carbon atoms, R' is H, and R" is H.

In some embodiments, PPO, or polypropylene oxide, is represented by the formula:

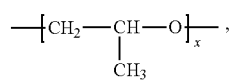

where x is an integer between 0 and 10, such as between 0 and 9, 0 and 8, 0 and 7, 0 and 6, 0 and 5, 0 and 4, 0 and 3, 0 and 2, 1 and 10, 1 and 9, 1 and 8, 1 and 7, 1 and 6, 1 and 5, 1 and 4, 1 and 3, 2 and 10, 2 and 9, 2 and 8, 2 and 7, 2 and 6, 2 and 5, 2 and 4, 3 and 10, 3 and 9, 3 and 8, 3 and 7, 3 and 6, 3 and 5, 4 and 10, 4 and 9, 4 and 8, 4 and 7, 4 and 6, 5 and 10, 5 and 9, 5 and 8, 5 and 7, 6 and 10, 6 and 9, 6 and 8, 7 and 10, 7 and 9, and 8 and 10. In some embodiments, x is 0, 1, 2, 3, 4, 5, 6, 7, 8, 9, or 10.

In some embodiments, PEO, or polyethylene oxide, is represented by the formula:

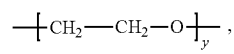

where y is an integer between 0 and 10, such as between 0 and 9, 0 and 8, 0 and 7, 0 and 6, 0 and 5, 0 and 4, 0 and 3, 0 and 2, 1 and 10, 1 and 9, 1 and 8, 1 and 7, 1 and 6, 1 and 5, 1 and 4, 1 and 3, 2 and 10, 2 and 9, 2 and 8, 2 and 7, 2 and 6, 2 and 5, 2 and 4, 3 and 10, 3 and 9, 3 and 8, 3 and 7, 3 and 6, 3 and 5, 4 and 10, 4 and 9, 4 and 8, 4 and 7, 4 and 6, 5 and 10, 5 and 9, 5 and 8, 5 and 7, 6 and 10, 6 and 9, 6 and 8, 7 and 10, 7 and 9, and 8 and 10.

In some embodiments, x and y are the same. In some embodiments, x and y are different.

In some embodiments, the phenolic backbone of the demulsifying polymer is made up of repeating phenol units, linked through a methylene linker. In some embodiments, n is an integer between 3 and 10, such as between 3 and 9, 3 and 8, 3 and 7, 3 and 6, 3 and 5, 4 and 10, 4 and 9, 4 and 8, 4 and 7, 4 and 6, 5 and 10, 5 and 9, 5 and 8, 5 and 7, 6 and 10, 6 and 9, 6 and 8, 7 and 10, 7 and 9, and 8 and 10.

In some embodiments of the demulsifier composition of the present disclosure, the demulsifying polymer has the structure:

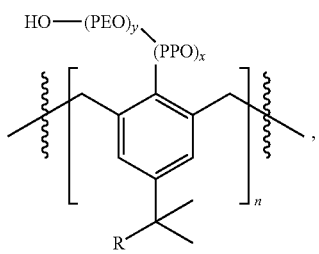

where R, x, y, and n are as disclosed in the present application.

In some embodiments of the demulsifier composition of the present disclosure, the demulsifying polymer has the structure:

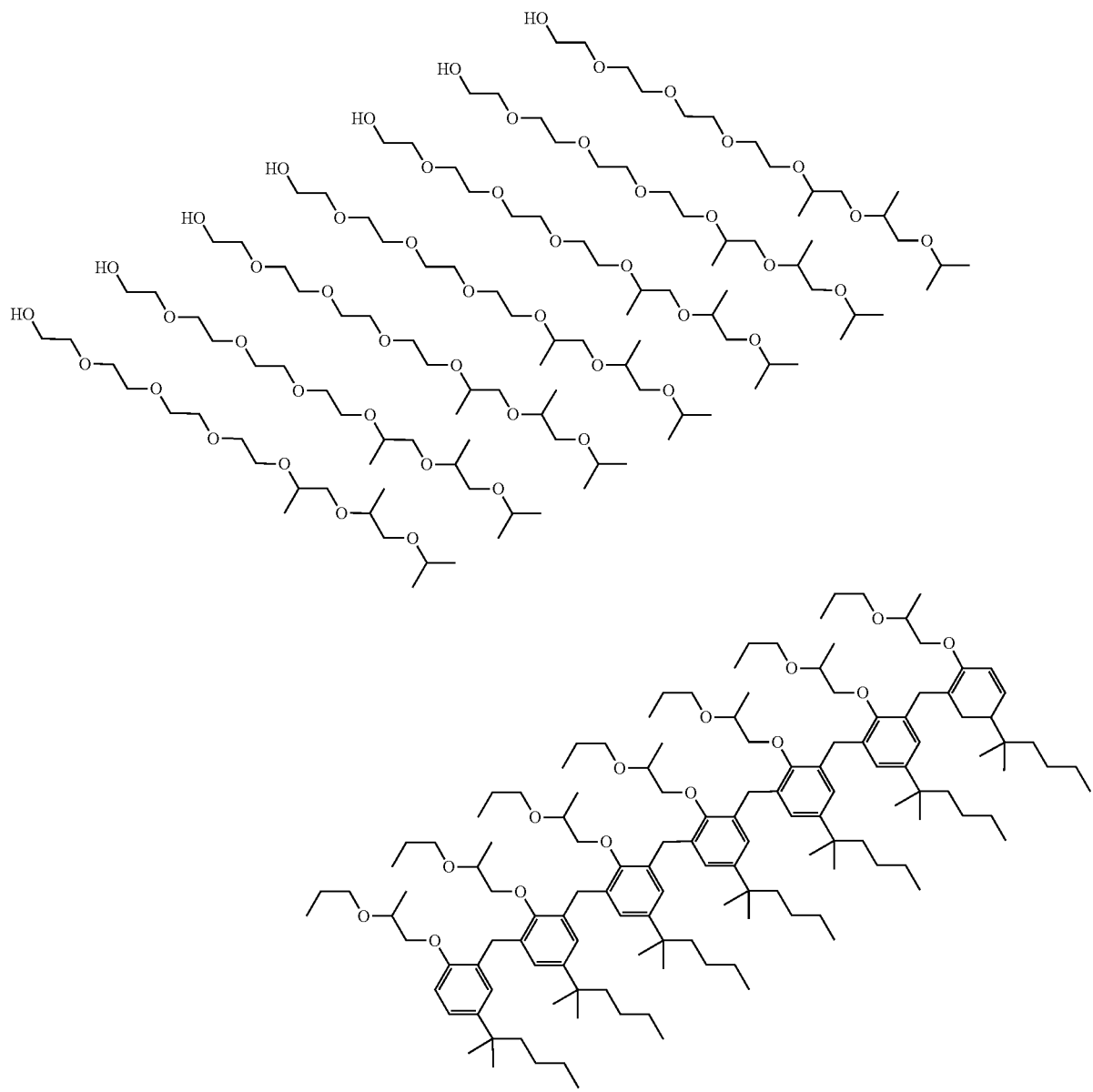

In some embodiments, the demulsifier composition contains about 25 wt % to about 50 wt % of a demulsifying polymer, such as about 25 wt % to about 45 wt %, about 25 wt % to about 40 wt %, about 25 wt % to about 35 wt %, about 25 wt % to about 30 wt %, about 30 wt % to about 50 wt %, about 30 wt % to about 45 wt %, about 30 wt % to about 40 wt %, about 30 wt % to about 35 wt %, about 35 wt % to about 50 wt %, about 35 wt % to about 45 wt %, about 35 wt % to about 40 wt %, about 40 wt % to about 50 wt %, about 40 wt % to about 45 wt %, about 45 wt % to about 50 wt %, or about 25 wt %, about 30 wt %, about 35 wt %, about 37 wt %, about 39 wt %, about 40 wt %, about 45 wt %, or about 50 wt %. In some embodiments, the demulsifier composition contains about 35 wt % to about 45 wt % of a demulsifying polymer. In some embodiments, the demulsifier composition contains about 37 wt % to about 40 wt % of a demulsifying polymer. In some embodiments, the demulsifier composition contains about 37 wt % of a demulsifying polymer. In some embodiments, the demulsifier composition contains about 39 wt % of a demulsifying polymer. In some embodiments, the demulsifier composition contains about 40 wt % of a demulsifying polymer.

Solvent

The demulsifier composition of the present disclosure contains a solvent, where the solvent is an alkyl carboxylic acid having an alkyl chain of 1 to 8 carbon atoms and a carboxylic acid functional group. Without wishing to be bound by any particular theory, it is believed that it is the combination of properties and characteristics of the solvent, such as the properties and characteristics described in the present disclosure, that result in its ability to efficiently separate water from a wet crude oil emulsion as compared to other solvents used in known demulsifier compositions. In some embodiments, it is the combination of one or more of alkyl chain length, carboxylic acid functional group, melting point, boiling point, pKa, and $K_{ow}$ that result in its ability to efficiently separate water from a wet crude oil emulsion as compared to other solvents used in known demulsifier compositions. In some embodiments, the combination of the solvent and a demulsifying polymer results in a synergetic effect when demulsifying wet crude oil emulsions.

In some embodiments, the solvent described in the present disclosure is an alkyl carboxylic acid having an alkyl chain of 1 to 8 carbon atoms and a carboxylic acid functional group. In some embodiments, the alkyl chain has 1 to 8 carbon atoms, such as 1 to 7, 1 to 6, 1 to 5, 1 to 4, 1 to 3, 2 to 8, 2 to 7, 2 to 6, 2 to 5, 2 to 4, 3 to 8, 3 to 7, 3 to 6, 3 to 5, 4 to 8, 4 to 7, 4 to 6, 5 to 8, 5 to 7, 6 to 8, or 1, 2, 3, 4, 5, 6, 7, or 8 carbon atoms. In some embodiments, the alkyl chain has 1 carbon atom. In some embodiments, the alkyl chain has 2 carbon atoms. In some embodiments, the alkyl chain has 3 carbon atoms. In some embodiments, the alkyl chain has 4 carbon atoms. In some embodiments, the alkyl chain has 5 carbon atoms. In some embodiments, the alkyl chain has 6 carbon atoms. In some embodiments, the alkyl chain has 7 carbon atoms. In some embodiments, the alkyl chain has 8 carbon atoms. In some embodiments, the alkyl chain is linear. In some embodiments, the alkyl chain is branched. In some embodiments, the alkyl chain has a branching pattern that includes, but is not limited to, iso-, neo-, anteiso-, and 2-alkyl-2-propyl groups.

In some embodiments, the alkyl carboxylic acid solvent described in the present disclosure has a melting point that allows the solvent to be liquid at the temperature of operation typically found in subterranean formations. In some embodiments, the temperature of operation is between about 30° C. and about 70° C. Thus, in some embodiments, the solvent has a melting point below about 30° C., such as below about 25° C., below about 20° C., below about 15° C., below about 10° C., or lower. In some embodiments, the solvent has a melting point below about 10° C. to about 15° C. In some embodiments, the solvent has a melting point below about 15° C. In some embodiments, the solvent has a melting point below about 10° C.

In some embodiments, the alkyl carboxylic acid solvent described in the present disclosure has a boiling point so that the solvent does not evaporate substantially at the temperature of operation typically found in subterranean formations. In some embodiments, the temperature of operation is between about 30° C. and about 70° C. Thus, in some embodiments, the solvent has a boiling point above about 70° C., such as above about 75° C., above about 80° C., above about 85° C., above about 90° C., or higher. In some embodiments, the solvent has a boiling point above about 80° C. to about 90° C. In some embodiments, the solvent has a boiling point above about 80° C. In some embodiments, the solvent has a boiling point above about 90° C.

In some embodiments, the alkyl carboxylic acid solvent described in the present disclosure has a pKa of about 2 to about 7, such as about 2 to about 6.5, about 2 to about 6, about 2 to about 5.5, about 2 to about 5, about 2 to about 4.5, about 2 to about 4, about 2 to about 3.5, about 2 to about 3, about 2 to about 2.5, about 2.5 to about 7, about 2.5 to about 6.5, about 2.5 to about 6, about 2.5 to about 5.5, about 2.5 to about 5, about 2.5 to about 4.5, about 2.5 to about 4, about 2.5 to about 3.5, about 2.5 to about 3, about 3 to about 7, about 3 to about 6.5, about 3 to about 6, about 3 to about 5.5, about 3 to about 5, about 3 to about 4.5, about 3 to about 4, about 3 to about 3.5, about 3.5 to about 7, about 3.5 to about 6.5, about 3.5 to about 6, about 3.5 to about 5.5, about 3.5 to about 5, about 3.5 to about 4.5, about 3.5 to about 4, about 4 to about 7, about 4 to about 6.5, about 4 to about 6, about 4 to about 5.5, about 4 to about 5, about 4 to about 4.5, about 4.5 to about 7, about 4.5 to about 6.5, about 4.5 to about 6, about 4.5 to about 5.5, about 4.5 to about 5, about 5 to about 7, about 5 to about 6.5, about 5 to about 6, about 5 to about 5.5, about 5.5 to about 7, about 5.5 to about 6.5, about 5.5 to about 6, about 6 to about 7, about 6 to about 6.5, about 6.5 to about 7, or about 3, about 3.5, about 4, about 4.5, about 5, about 5.5, about 6, about 6.5, or about 7. In some embodiments, the alkyl carboxylic acid solvent described in the present disclosure has a pKa of about 3 to about 6. In some embodiments, the alkyl carboxylic acid solvent described in the present disclosure has a pKa of about 4 to about 5. The pKa of the solvent is generally about 2 or higher, such as about 2 to about 7. Below a pKa of about 2, the acidity of the solvent could decompose the demulsifying polymer, for example, an alkoxylated phenolic polymer, and could corrode the equipment (tanks, pumps, pipes). Thus, in some embodiments, the solvent is not a sulfonic acid or a monoester sulfuric acid having an alkyl chain of 1 to 8 carbons.

In some embodiments, the alkyl carboxylic acid solvent described in the present disclosure is more lipophilic than hydrophilic. This property can be quantified by the octanol and water coefficient partition ($K_{ow}$). In some embodiments, the solvent of the present disclosure has a $K_{ow}$ greater than about 0.1. In some embodiments, the solvent has a $K_{ow}$ greater than about 0.3, about 0.5, about 1.0, about 1.25, about 1.5, about 2, about 2.5, about 3, or greater.

In some embodiments, the alkyl carboxylic acid solvent described in the present disclosure is safe to use. In some embodiments, the solvent is non-toxic. In some embodiments, the solvent is not highly flammable.

Exemplary solvents of the present disclosure include alkyl carboxylic acids having an alkyl chain of 1 to 8 carbon atoms and a carboxylic acid functional group and one or more of a pKa of about 2 to about 7, a $K_{ow}$ greater than 0.1, a melting point of about 15° C. or lower, and a boiling point of about 80° C. or higher. In some embodiments, the solvent is valeric acid. In some embodiments, the solvent is caprylic acid. In some embodiments, the solvent is acetic acid. In some embodiments, the solvent is propionic acid.

In some embodiments, the solvent is not a carboxylic acid having a hydroxy group (for example, lactic acid), one or more aromatic rings, or more than 8 carbons in the alkyl chain. In some embodiments, the solvent is not pivalic acid.

In some embodiments, the total amount of solvent in the demulsifier composition is about 20 wt % to about 60 wt %, such as about 20 wt % to about 55 wt %, about 20 wt % to about 50 wt %, about 20 wt % to about 45 wt %, about 20 wt % to about 40 wt %, about 20 wt % to about 35 wt %, about 20 wt % to about 30 wt %, about 20 wt % to about 25 wt %, about 25 wt % to about 60 wt %, about 25 wt % to about 55 wt %, about 25 wt % to about 50 wt %, about 25 wt % to about 45 wt %, about 25 wt % to about 40 wt %, about 25 wt % to about 35 wt %, about 25 wt % to about 30 wt %, about 30 wt % to about 60 wt %, about 30 wt % to about 55 wt %, about 30 wt % to about 50 wt %, about 30 wt % to about 45 wt %, about 30 wt % to about 40 wt %, about 30 wt % to about 35 wt %, about 35 wt % to about 60 wt %, about 35 wt % to about 55 wt %, about 35 wt % to about 50 wt %, about 35 wt % to about 45 wt %, about 35 wt % to about 40 wt %, about 40 wt % to about 60 wt %, about 40 wt % to about 55 wt %, about 40 wt % to about 50 wt %, about 40 wt % to about 45 wt %, about 45 wt % to about 60 wt %, about 45 wt % to about 55 wt %, about 45 wt % to about 50 wt %, about 50 wt % to about 60 wt %, about 50 wt % to about 55 wt %, about 55 wt % to about 60 wt %, or about 20 wt %, about 25 wt %, about 30 wt %, about 35 wt %, about 40 wt %, about 45 wt %, about 49 wt %, about 50 wt %, about 52 wt %, about 55 wt %, or about 60 wt %. In some embodiments, the total amount of solvent in the demulsifier composition is about 45 wt % to about 55 wt %. In some embodiments, the total amount of solvent in the demulsifier composition is about 49 wt %. In some embodiments, the total amount of solvent in the demulsifier composition is about 50 wt %. In some embodiments, the total amount of solvent in the demulsifier composition is about 52 wt %.

In some embodiments, the demulsifier composition contains one or more clarifiers. Examples of suitable clarifiers include, but are not limited to, trimethylbenzene, naphthalene, and combinations thereof. In some embodiments, the clarifier is a trimethylbenzene. In some embodiments, the clarifier is 1,2,4-trimethylbenzene. In some embodiments, the clarifier is naphthalene. In some embodiments, the clarifier is a mixture of 1,2,4-trimethylbenzene and naphthalene.

In some embodiments, the amount of clarifier in the demulsifier composition is about 0.1 wt % to about 10 wt %, such as about 0.1 wt % to about 9 wt %, about 0.1 wt % to about 8 wt %, about 0.1 wt % to about 7 wt %, about 0.1 wt % to about 6 wt %, about 0.1 wt % to about 5 wt %, about 0.1 wt % to about 4 wt %, about 0.1 wt % to about 3 wt %, about 0.1 wt % to about 2 wt %, about 0.1 wt % to about 1 wt %, about 0.1 wt % to about 0.5 wt %, about 0.5 wt % to about 10 wt %, about 0.5 wt % to about 9 wt %, about 0.5 wt % to about 8 wt %, about 0.5 wt % to about 7 wt %, about 0.5 wt % to about 6 wt %, about 0.5 wt % to about 5 wt %, about 0.5 wt % to about 4 wt %, about 0.5 wt % to about 3 wt %, about 0.5 wt % to about 2 wt %, about 0.5 wt % to about 1 wt %, about 1 wt % to about 10 wt %, about 1 wt % to about 9 wt %, about 1 wt % to about 8 wt %, about 1 wt % to about 7 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 10 wt %, about 2 wt % to about 9 wt %, about 2 wt % to about 8 wt %, about 2 wt % to about 7 wt %, about 2 wt % to about 6 wt %, about 2 wt % to about 5 wt %, about 2 wt % to about 4 wt %, about 2 wt % to about 3 wt %, about 3 wt % to about 10 wt %, about 3 wt % to about 9 wt %, about 3 wt % to about 8 wt %, about 3 wt % to about 7 wt %, about 3 wt % to about 6 wt %, about 3 wt % to about 5 wt %, about 3 wt % to about 4 wt %, about 4 wt % to about 10 wt %, about 4 wt % to about 9 wt %, about 4 wt % to about 8 wt %, about 4 wt % to about 7 wt %, about 4 wt % to about 6 wt %, about 4 wt % to about 5 wt %, about 5 wt % to about 10 wt %, about 5 wt % to about 9 wt %, about 5 wt % to about 8 wt %, about 5 wt % to about 7 wt %, about 5 wt % to about 6 wt %, about 6 wt % to about 10 wt %, about 6 wt % to about 9 wt %, about 6 wt % to about 8 wt %, about 6 wt % to about 7 wt %, about 7 wt % to about 10 wt %, about 7 wt % to about 9 wt %, about 7 wt % to about 8 wt %, about 8 wt % to about 10 wt %, about 8 wt % to about 9 wt %, about 9 wt % to about 10 wt %, or about 0.1 wt %, about 0.5 wt %, about 1 wt %, about 2 wt %, about 3 wt %, about 4 wt %, about 5 wt %, about 6 wt %, about 7 wt %, about 8 wt %, about 9 wt %, or about 10 wt %. In some embodiments, the amount of clarifier in the demulsifier composition is about 5 wt % to about 10 wt %. In some embodiments, the amount of clarifier in the demulsifier composition is about 0.1 wt % to about 5 wt %. In some embodiments, the amount of clarifier in the demulsifier composition is about 10 wt %. In some embodiments, the clarifier is 1,2,4-trimethylbenzene.

In some embodiments, the demulsifier compositions of the present disclosure further contain one or more other solvents in addition to the solvent of the present disclosure. In some embodiments, the composition contains one or more additional solvents to increase the response of the emulsifier (less lag time). In some embodiments, the one or more additional solvents is selected from an alcohol, an alkylene glycol, and combinations thereof. In some embodiments, the one or more additional solvents include methanol, diethylene glycol, or a combination thereof. In some embodiments, the demulsifier composition of the present disclosure contains caprylic acid, methanol, and diethylene glycol.

Thus, provided in the present disclosure is a demulsifier composition that contains a demulsifying polymer and a solvent as described in the present disclosure. In some embodiments, the solvent is an alkyl carboxylic acid having an alkyl chain of 1 to 8 carbon atoms, a pKa about 2 to about 7, a $K_{ow}$ greater than about 0.1, a melting point of about 15° C. or lower, and a boiling point of about 80° C. or higher. In some embodiments, the demulsifier composition contains a clarifier.

Also provided in the present disclosure is a demulsifier composition that contains a demulsifying polymer and a solvent as described in the present disclosure. In some embodiments, the solvent is an alkyl carboxylic acid having an alkyl chain of 1 to 8 carbon atoms, a pKa between about 3 and about 6, a $K_{ow}$ greater than about 0.1, a melting point of about 15° C. or lower, and a boiling point of about 80° C. or higher. In some embodiments, the demulsifier composition contains a clarifier.

Also provided in the present disclosure is a demulsifier composition that contains a demulsifying polymer and a solvent as described in the present disclosure. In some embodiments, the solvent is an alkyl carboxylic acid having an alkyl chain of 1 to 8 carbon atoms, a pKa between about 3 and about 6, a $K_{ow}$ greater than about 0.1, a melting point of about 10° C. or lower, and a boiling point of about 90° C. or higher.

In some embodiments, the demulsifier composition contains about 25 wt % to about 50 wt % of a demulsifying polymer, about 20 wt % to about 60 wt % of a solvent as described in the present disclosure, and about 0.1 wt % to about 10 wt % clarifier. In some embodiments, the demulsifier composition contains about 35 wt % to about 45 wt % of a demulsifying polymer, about 45 wt % to about 55 wt % of a solvent as described in the present disclosure, and about 10 wt % to about 15 wt % clarifier.

Methods of Using the Demulsifier Composition Containing the Demulsifying Polymer The demulsifier compositions of the present disclosure that contain a demulsifying polymer and a solvent that is an alkyl carboxylic acid having an alkyl chain of 1 to 8 carbon atoms and a carboxylic acid functional group, have a greater activity towards dewatering wet crude oil emulsions than known demulsifier compositions, such as those that contain other solvents commonly found in demulsifier composition, such as alcohols, alcohol ethers, and naphtha (aromatics, long and cyclic alkanes, and heavy hydrocarbons). It has surprisingly been found that the solvents of the present disclosure, in combination with a demulsifying polymer, significantly increase the water separation activity of the demulsifier compositions of the present disclosure. In some embodiments, the demulsifier compositions of the present disclosure are more effective at separating water from a water-in-oil emulsion than known demulsifier compositions, including those that have shown little to no effect on water separation in the same emulsion. In some embodiments, the demulsifier compositions of the present disclosure are used for water-in-oil emulsions in a subterranean formation for drilling operations. In some embodiments, the demulsifier compositions of the present disclosure are used for oilfield production at gas-oil separation plants. In some embodiments, the demulsifier compositions of the present disclosure are used for desalting at refineries. Thus, provided in the present disclosure are methods of using the demulsifier compositions that contain the solvents of the present disclosure for such applications.

In some embodiments of the methods, the demulsifier compositions containing a demulsifying polymer and a solvent of the present disclosure yield greater than about 10 mL of water separated after about 60 minutes at 50 ppm and 30° C., such as about 11 mL, about 12 mL, about 13 mL, about 14 mL, about 15 mL, about 16 mL, about 17 mL, about 18 mL, about 19 mL, about 20 mL, about 21 mL, about 22 mL, about 23 mL, about 24 mL, about 25 mL, or more. In some embodiments, the demulsifier compositions containing a demulsifying polymer and a solvent of the present disclosure remove at least about 35 vol % of water from a water-in-oil emulsion after about 60 minutes at 50 ppm and 30° C., such as at least about 40 vol %, about 45 vol %, about 50 vol %, about 55 vol %, about 60 vol %, about 65 vol %, about 70 vol %, about 75 vol %, about 80 vol %, about 85 vol %, about 90 vol %, about 95 vol %, or more. In some embodiments, the water volume separated from a water-in-oil emulsion using the demulsifier compositions of the present disclosure is at least about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 100%, or greater than the water volume separated from a water-in-oil emulsion using a known demulsifier composition that contains a solvent other than the solvent of the present disclosure.

In some embodiments, the demulsifier compositions of the present disclosure are used to resolve emulsions encountered in crude oil production. In some embodiments, the demulsifier composition of the present disclosure is introduced into the crude oil emulsion by injecting prior to entering the GOSP, by injecting into the crude oil before the desalter, or by injecting into the crude oil process stream at a point between the oil production and the final oil storage tank. The demulsifier composition can be injected continuously or in batch fashion. In some embodiments, the injection is accomplished using electric or gas pumps.

After injection, in some embodiments the treated crude oil emulsion is allowed to stand in a quiescent state until the desired separation into distinct layers of water and oil results. Once separation into distinct layers of water and oil has been effected, any means known to those of skill in the art can be utilized for withdrawing the free water and separating crude oil.

Also provided in the present disclosure is a method of dewatering a water-in-oil emulsion. In some embodiments, the method includes adding a demulsifier composition comprising a demulsifying polymer and a solvent as described in the present disclosure to a water-in-oil emulsion. In some embodiments, the method involves separating the water from the emulsion. In some embodiments, the water-in-oil emulsion is a crude oil emulsion. In some embodiments, the crude oil emulsion is a refinery desalting emulsion. In some embodiments, the crude oil emulsion is a crude oil production emulsion.

Also provided in the present disclosure is a method of treating produced petroleum that contains an emulsion. In some embodiments, the method includes contacting the produced petroleum that contains the emulsion with a demulsifier composition to reduce or eliminate the emulsion. In some embodiments, the demulsifier composition contains a demulsifying polymer and a solvent as described in the present disclosure.

EXAMPLES

Example 1—Preparation of Demulsifier Formulations

A series of demulsifier formulations were prepared that contained an alkoxylated phenolic demulsifying polymer, a clarifier, and a series of solvents.

The demulsifying alkoxylated phenolic polymer used in the formulations contained a formaldehyde-phenolic backbone with a lipophilic polypropylene oxide (PPO) section and hydrophilic polyethylene oxide (PEO) section. The monomer repetition of PEO and PPO ranged from 3 to 6, centered on 4 units (determined by $^1$H-NMR). The formaldehyde-phenolic backbone was composed of phenol with a para saturated hydrocarbon chain composed of 7 carbons, forming a para-tertiary-alkyl moiety. The phenolic backbone was constituted of 5 to 10 phenol units, centered on 7 units (determined by $^1$H-NMR). The demulsifying polymer had a number average molecular weight (Mn) of 4278 g/mol (determined by GPC and MALDI-TOF) and the structure:

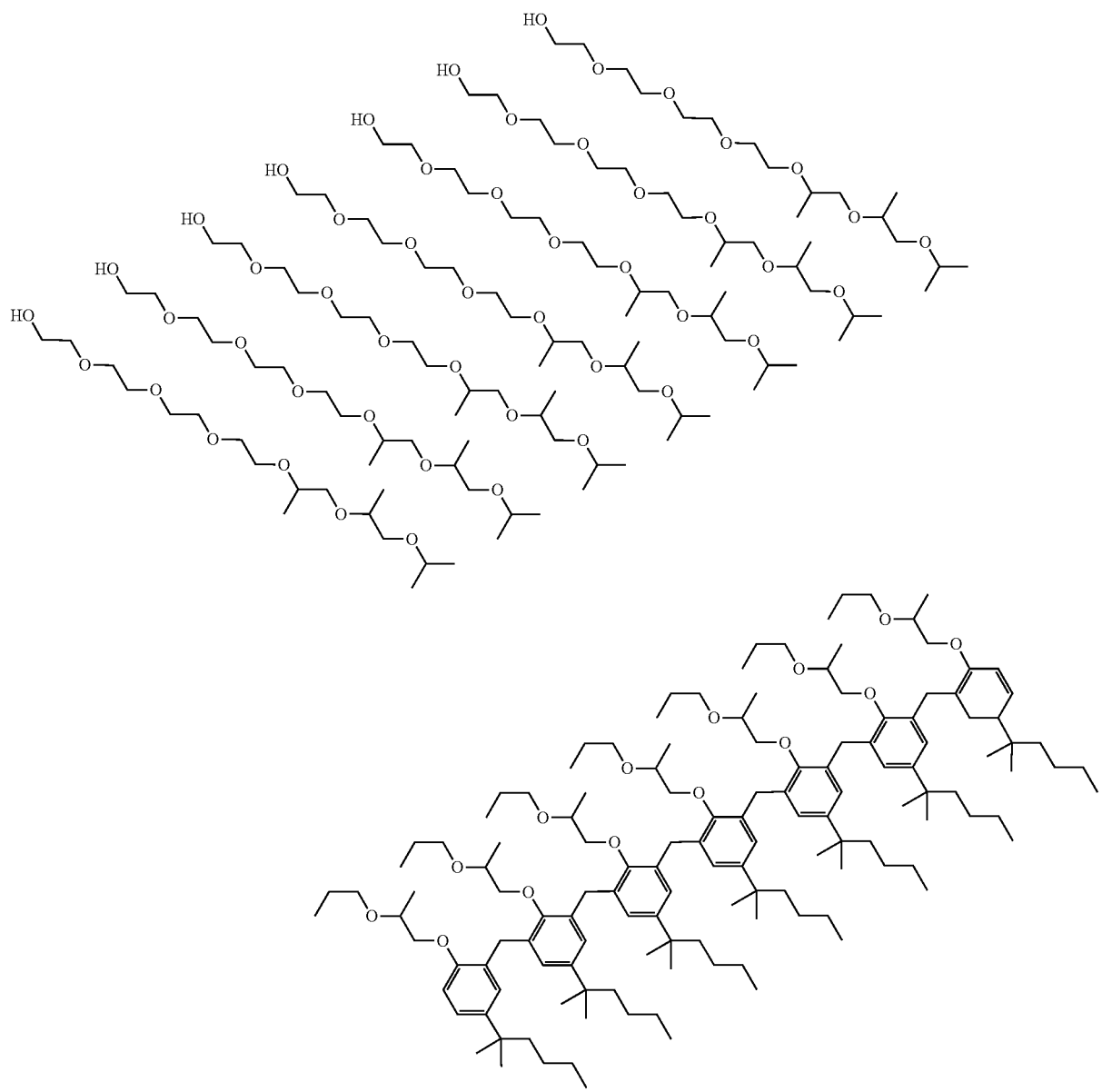

The demulsifying alkoxylated phenolic polymer was combined with a clarifier and a solvent in the amounts shown in Table 1.

TABLE 1

Demulsifier formulations

| Entry | Solvent | Polymer (wt %) | Clarifier (wt %) | Solvent (wt %) |
|---|---|---|---|---|
| 1 | Methanol | 43 | 12 | 45 |
| 2 | Ethanol | 43 | 12 | 45 |
| 3 | n-Propanol | 43 | 12 | 45 |
| 4 | n-Butanol | 42 | 12 | 46 |
| 5 | Diethylene glycol | 37 | 11 | 52 |
| 6 | Xylenes | 43 | 12 | 45 |
| 7 | Methane sulfonic acid | 32 | 9 | 59 |
| 8 | Acetic acid | 37 | 11 | 52 |
| 9 | Propionic acid | 39 | 11 | 50 |

TABLE 1-continued

Demulsifier formulations

| Entry | Solvent | Polymer (wt %) | Clarifier (wt %) | Solvent (wt %) |
|---|---|---|---|---|
| 10 | Valeric acid | 39 | 12 | 49 |
| 11 | Caprylic acid | 40 | 11 | 49 |

The clarifier was 1,2,4-trimethylbenzene, but naphthalene or a combination of these compounds could also be used.

Example 2—Bottle Tests of the Emulsions

A bottle-test was performed on an emulsion made of an Arabian medium crude oil. The size of the bottle test was 100 mL. The Arabian medium crude oil used in this test had an API gravity of 28.8° and was composed of 30 wt % saturated hydrocarbons, 34 wt % aromatics, 11 wt % resins (NSO), and 25 wt % asphaltenes. The wet crude oil emulsion is highly stable up to a high temperature of 80° C. The methodology of the bottle-test was described in Raynel et al. (Oil Gas Sci. Technol. —Rev. IFP Energies Nouvelles (2021) 76:19).

The water separation performance of the various demulsifier formulations at 50 ppm and 30° C. is shown in FIG. 1. All known solvents (entries 1 to 6 in Table 1) yielded approximately 10 mL of water separated after 60 minutes. The solvents of the present disclosure (entries 8 to 11 of Table 1) demonstrated increased water separation performance with the increase of the number of carbons. No water separation was observed with methane sulfonic acid ($MeSO_3H$), while a water separation of 22 mL was observed with caprylic acid. The water content of the emulsion was 30 vol % of water. Caprylic acid removed 72 vol % of water from the emulsion after 60 min.

Figure 2:
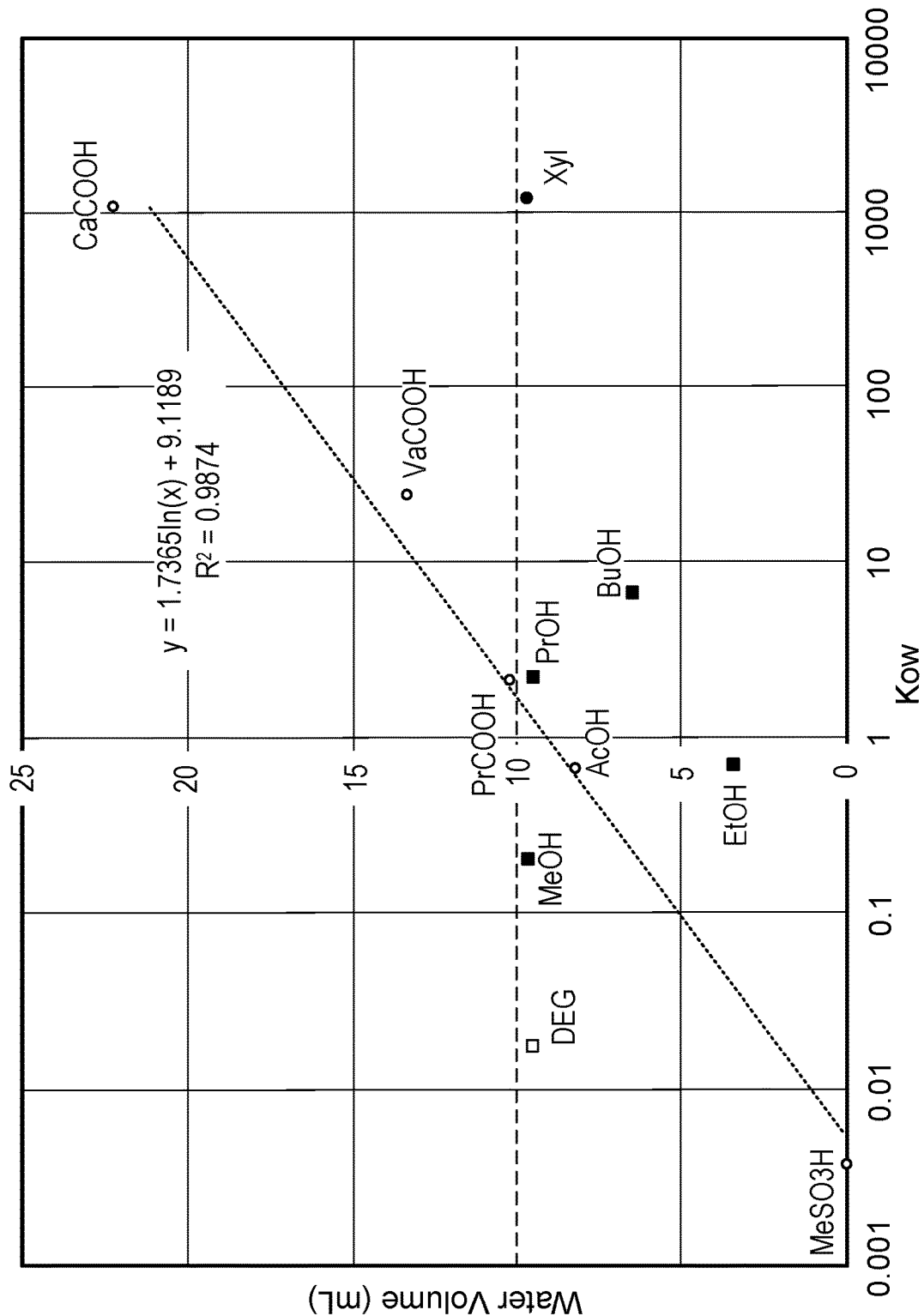
FIG. 2 shows the water separation performance vs. water coefficient partition ($K_{ow}$) of demulsifier compositions prepared from various solvents.

A linear regression can be drawn between water separated and the octanol and water coefficient partition ($K_{ow}$) of these acid solvents (diagonal line in FIG. 2).

While no relationship between the same alcohol series was observed, there did appear to be an upper limit of water which can be separated with the commercial solvents (entries 1 to 6).

What is claimed is:

1. A demulsifier composition, comprising:
   about 25 wt % to about 45 wt % of a demulsifying polymer; and
   about 30 wt % to about 60 wt % of a solvent, wherein the solvent is an alkyl carboxylic acid having an alkyl chain of 1 to 8 carbon atoms, a pKa of about 2 to about 7, and a $K_{ow}$ greater than about 0.1.

2. The demulsifier composition of claim 1, wherein the demulsifying polymer is an alkoxylated phenolic polymer or an alkoxylated polyalcohol.

3. The demulsifier composition of claim 2, wherein the alkoxylated phenolic polymer is para-substituted with a saturated hydrocarbon chain.

4. The demulsifier composition of claim 3, wherein the saturated hydrocarbon chain is selected from para-tertiary-alkyl, para-secondary-alkyl, para-iso-alkyl, para-cycloalkyl, and para-n-alkyl.

5. The demulsifier composition of claim 3, wherein the saturated hydrocarbon chain is selected from para-tertiary-butylphenol, para-tertiary-amylphenol, para-tertiary-hexylphenol, and para-tertiary-heptylphenol.

6. The demulsifier composition of claim 2, wherein the alkoxylated phenolic polymer has the structure:

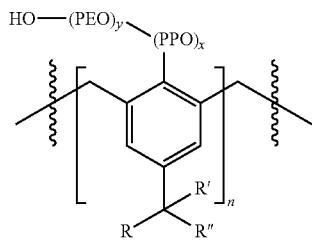

wherein:
R is a saturated hydrocarbon chain having between 1 and 8 carbons;
R' and R" are each independently selected from H and $C_1$-$C_2$ alkyl;
wherein the total number of carbon atoms in R, R', and R" is between 3 and 8;
PPO is polypropylene oxide having the formula:

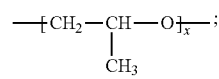

PEO is polyethylene oxide having the formula:

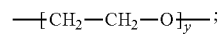

x is an integer between 0 and 10;
y is an integer between 0 and 10; and
n is an integer between 3 and 10.

7. The demulsifier composition of claim 6, wherein the demulsifying polymer has the structure:

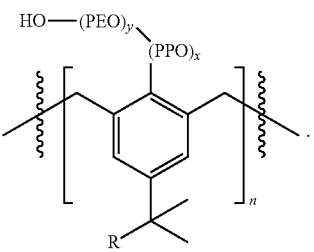

8. The demulsifier composition of claim 1, wherein the demulsifying polymer has the structure:

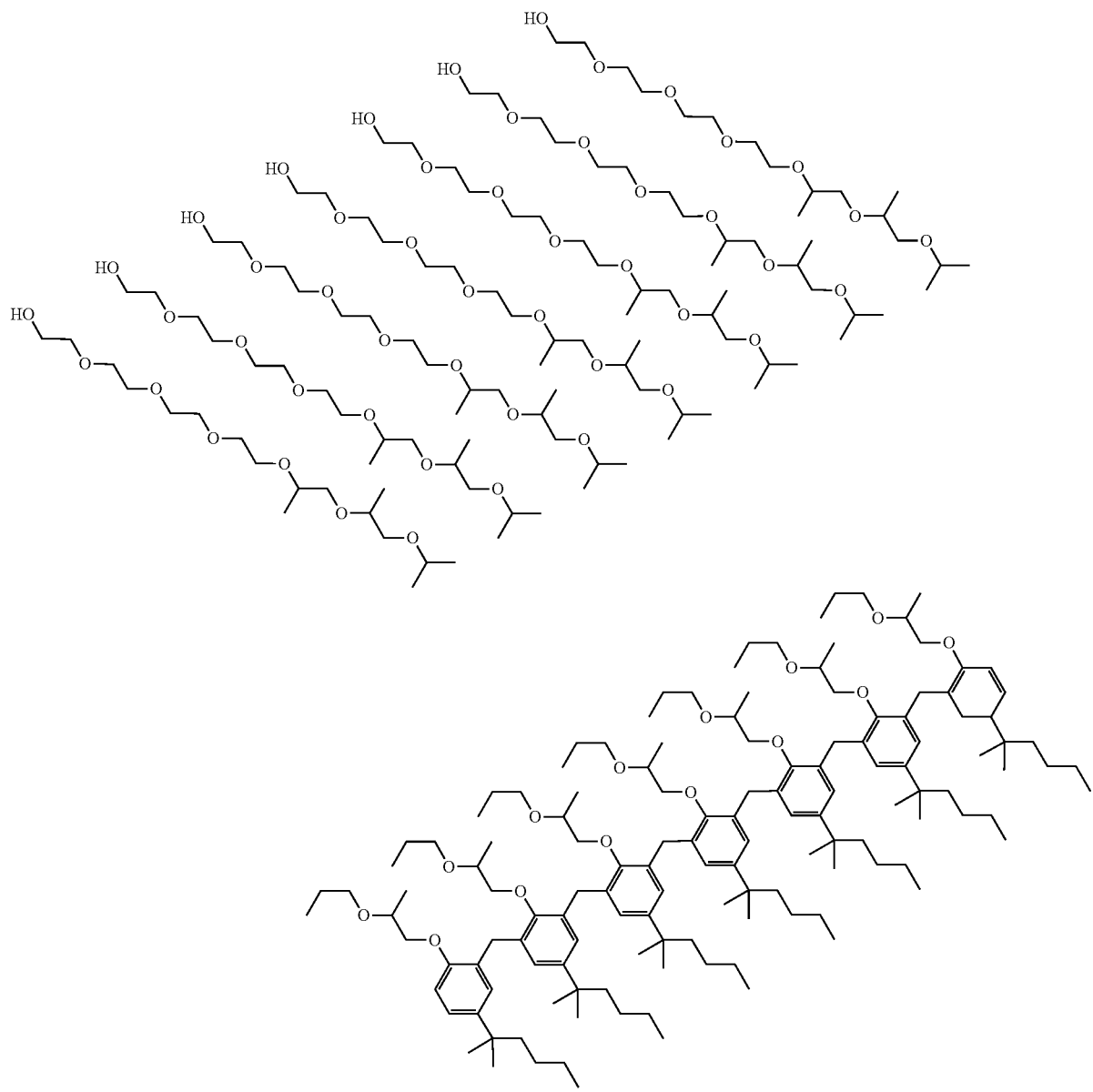

9. The demulsifier composition of claim 1, wherein the demulsifier composition comprises about 30 wt % to about 40 wt % demulsifying polymer.

10. The demulsifier composition of claim 1, wherein the demulsifier composition comprises about 45 wt % to about 55 wt % solvent.

11. The demulsifier composition of claim 1, wherein the alkyl chain of the alkyl carboxylic acid is linear or branched.

12. The demulsifier composition of claim 1, wherein the pKa of the solvent is about 3 to about 6.

13. The demulsifier composition of claim 1, wherein the alkyl carboxylic acid has a melting point of about 15° C. or lower.

14. The demulsifier composition of claim 1, wherein the alkyl carboxylic acid has a melting point of about 10° C. or lower.

15. The demulsifier composition of claim 1, wherein the alkyl carboxylic acid has a boiling point of about 80° C. or higher.

16. The demulsifier composition of claim 1, wherein the alkyl carboxylic acid has a boiling point of about 90° C. or higher.

17. The demulsifier composition of claim 1, wherein the solvent is an alkyl carboxylic acid having an alkyl chain of 1 to 8 carbon atoms, a pKa between about 2 and about 7, a $K_{ow}$ greater than about 0.1, a melting point of about 15° C. or lower, and a boiling point of about 80° C. or higher.

18. The demulsifier composition of claim 1, wherein the solvent is an alkyl carboxylic acid having an alkyl chain of 1 to 8 carbon atoms, a pKa between about 3 and about 6, a $K_{ow}$ greater than about 0.1, a melting point of about 10° C. or lower, and a boiling point of about 90° C. or higher.

19. The demulsifier composition of claim 1, further comprising a clarifier.

20. The demulsifier composition of claim 19, wherein the clarifier is selected from 1,2,4-trimethylbenzene, naphthalene, and combinations thereof.

21. The demulsifier composition of claim 19, wherein the clarifier comprises about 0.1 wt % to about 10 wt % of the demulsifier composition.

22. A method of dewatering a water-in-oil emulsion, comprising adding the demulsifier composition according to claim 1 to a water-in-oil emulsion and separating the water from the emulsion.

23. The method of claim 22, wherein the water-in-oil emulsion is a crude oil emulsion.

24. The method of claim 23, wherein the crude oil emulsion is a refinery desalting emulsion.

25. The method of claim 23, wherein the crude oil emulsion is a crude oil production emulsion.

26. A method of treating produced petroleum comprising an emulsion, the method comprising contacting the produced petroleum comprising the emulsion with the demulsifier composition according to claim 1 to reduce or eliminate the emulsion.

* * * * *

UNITED STATES PATENT AND TRADEMARK OFFICE
CERTIFICATE OF CORRECTION

PATENT NO. : 12,179,129 B2
APPLICATION NO. : 17/550804
DATED : December 31, 2024
INVENTOR(S) : Raynel et al.

Page 1 of 2

It is certified that error appears in the above-identified patent and that said Letters Patent is hereby corrected as shown below:

In the Claims

Columns 23-24, Lines 1-45, Claim 8, please replace:

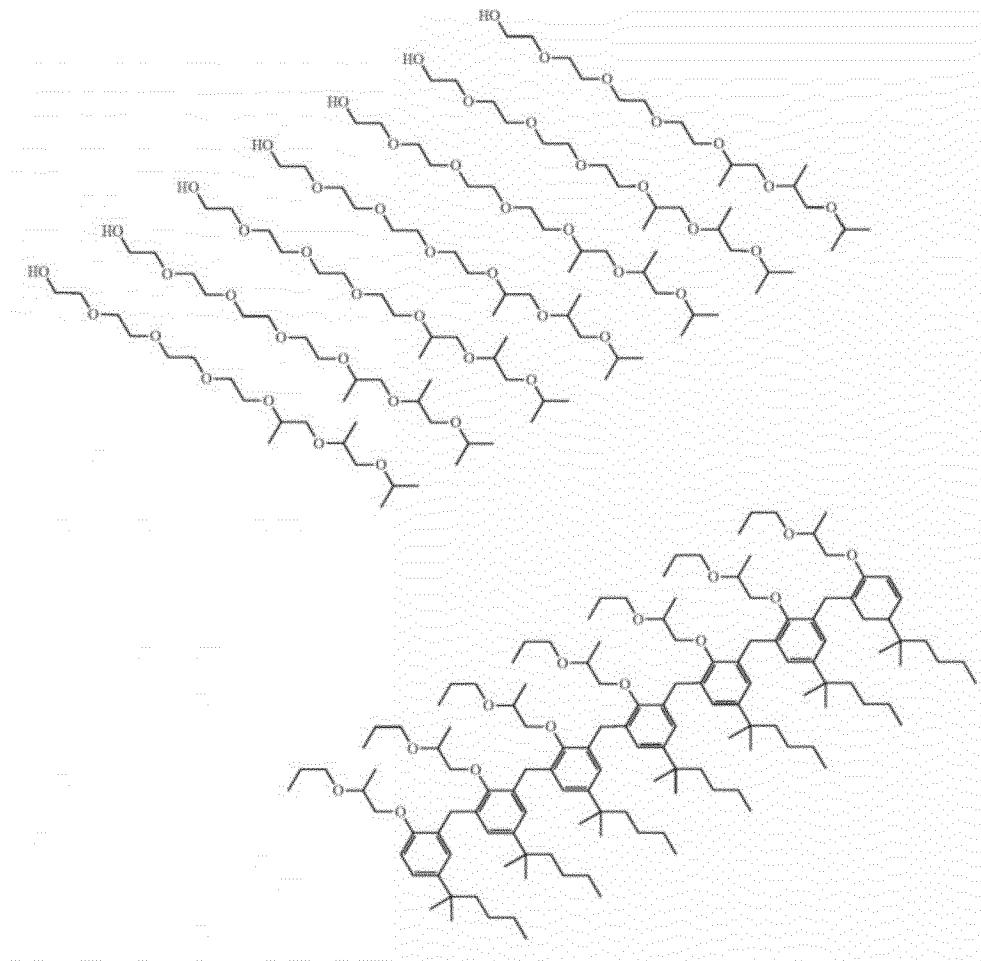

Signed and Sealed this
Eighteenth Day of March, 2025

Coke Morgan Stewart
*Acting Director of the United States Patent and Trademark Office*

CERTIFICATE OF CORRECTION (continued)
U.S. Pat. No. 12,179,129 B2

With:

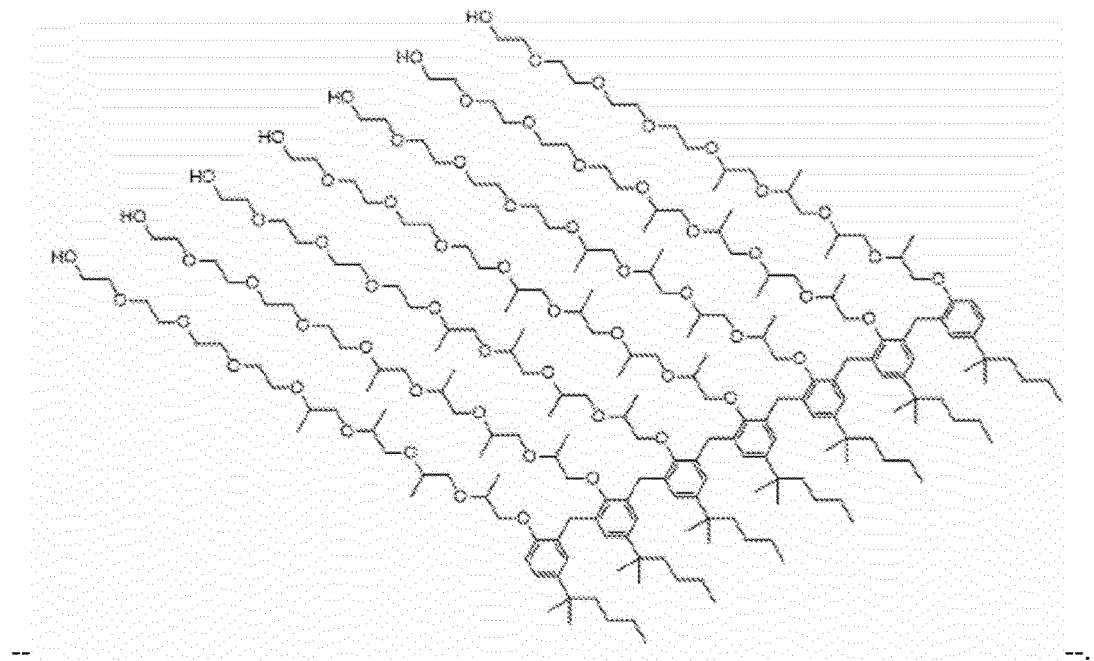

--                                                                 --.